United States Patent
Osawa et al.

(10) Patent No.: US 7,359,401 B2
(45) Date of Patent: Apr. 15, 2008

(54) TRANSMITTER/RECEIVER APPARATUS

(75) Inventors: Shohei Osawa, Osaka (JP); Fumihiro Fukae, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 955 days.

(21) Appl. No.: 10/628,498

(22) Filed: Jul. 29, 2003

(65) Prior Publication Data
US 2004/0037274 A1 Feb. 26, 2004

(30) Foreign Application Priority Data
Aug. 1, 2002 (JP) ............... 2002-224450

(51) Int. Cl.
*H04J 3/02* (2006.01)
(52) U.S. Cl. ...................... 370/462; 370/422
(58) Field of Classification Search ............... 370/462, 370/230, 235, 422
See application file for complete search history.

(56) References Cited

U.S. PATENT DOCUMENTS

| | | | | |
|---|---|---|---|---|
| 5,838,681 A | * | 11/1998 | Bonomi et al. | 370/395.41 |
| 6,108,306 A | * | 8/2000 | Kalkunte et al. | 370/235 |
| 6,661,797 B1 | * | 12/2003 | Goel et al. | 370/395.21 |
| 6,680,908 B1 | * | 1/2004 | Gibson et al. | 370/229 |
| 6,751,194 B1 | * | 6/2004 | Ueno | 370/235 |
| 6,909,699 B2 | | 6/2005 | Masunaga et al. | |
| 2005/0007952 A1 | * | 1/2005 | Scott | 370/229 |
| 2006/0239204 A1 | * | 10/2006 | Bordonaro et al. | 370/253 |

FOREIGN PATENT DOCUMENTS

| JP | 3159144 B2 | 2/2001 |
|---|---|---|
| JP | A-2002-009796 | 11/2002 |

* cited by examiner

*Primary Examiner*—Ricky Q. Ngo
*Assistant Examiner*—Gary Mui
(74) *Attorney, Agent, or Firm*—Birch, Stewart, Kolasch & Birch, LLP

(57) ABSTRACT

A transmitter/receiver apparatus has a status checker that checks whether a plurality of ports of different types are active or not and a reference table that holds, among the transmission delay values between the individual ports, the maximum values corresponding to different combinations of active ports. A value read out from the reference table according to the output signal of the status checker is assigned, as the transmission delay value of the transmitter/receiver apparatus, to a base register. This configuration permits efficient communication.

26 Claims, 41 Drawing Sheets

FIG. 2

| port_active | COMBINATION-SPECIFIC MAX.TRANSMISSION DELAY |
|---|---|
| 0 0 0 0 | 0 |
| 0 0 0 1 | 0 |
| 0 0 1 0 | 0 |
| 0 0 1 1 | 8 |
| 0 1 0 0 | 0 |
| 0 1 0 1 | 5 |
| 0 1 1 0 | 9 |
| 0 1 1 1 | 9 |

| port_active | COMBINATION-SPECIFIC MAX.TRANSMISSION DELAY |
|---|---|
| 1 0 0 0 | 0 |
| 1 0 0 1 | 2 |
| 1 0 1 0 | 6 |
| 1 0 1 1 | 8 |
| 1 1 0 0 | 3 |
| 1 1 0 1 | 5 |
| 1 1 1 0 | 9 |
| 1 1 1 1 | 9 |

→ PORT_4(g108)
→ PORT_3(g107)
→ PORT_2(g106)
→ PORT_1(g105)

{ 1: ACTIVE PORT
 0: NON-ACTIVE PORT

FIG.3

| port_active | COMBINATION-SPECIFIC MAX.TRANSMISSION DELAY |
|---|---|
| 0000 | 0 |
| 0001 | 4 |
| 0010 | 10 |
| 0011 | 10 |
| 0100 | 7 |
| 0101 | 7 |
| 0110 | 10 |
| 0111 | 10 |

| port_active | COMBINATION-SPECIFIC MAX.TRANSMISSION DELAY |
|---|---|
| 1000 | 1 |
| 1001 | 4 |
| 1010 | 10 |
| 1011 | 10 |
| 1100 | 7 |
| 1101 | 7 |
| 1110 | 10 |
| 1111 | 10 |

PORT_4(g108)
PORT_3(g107)
PORT_2(g106)
PORT_1(g105)

1: ACTIVE PORT
0: NON-ACTIVE PORT

FIG.6

| port_active | COMBINATION-SPECIFIC MAX.TRANSMISSION DELAY |
|---|---|
| 10000 | 0 |
| 10001 | 4 |
| 10010 | 10 |
| 10011 | 10 |
| 10100 | 7 |
| 10101 | 7 |
| 10110 | 10 |
| 10111 | 10 |

| port_active | COMBINATION-SPECIFIC MAX.TRANSMISSION DELAY |
|---|---|
| 11000 | 1 |
| 11001 | 4 |
| 11010 | 10 |
| 11011 | 10 |
| 11100 | 7 |
| 11101 | 7 |
| 11110 | 10 |
| 11111 | 10 |

↑ PORT_5(g129)
↑ PORT_4(g128)
↑ PORT_3(g127)
↑ PORT_2(g126)
↑ PORT_1(g125)

{ 1: ACTIVE PORT
  0: NON-ACTIVE PORT

FIG.11

| port_active | COMBINATION-SPECIFIC MAX.JITTER |
|---|---|
| 0000 | 0 |
| 0001 | 0 |
| 0010 | 0 |
| 0011 | 3 |
| 0100 | 0 |
| 0101 | 5 |
| 0110 | 9 |
| 0111 | 9 |

| port_active | COMBINATION-SPECIFIC MAX.JITTER |
|---|---|
| 1000 | 0 |
| 1001 | 2 |
| 1010 | 6 |
| 1011 | 6 |
| 1100 | 3 |
| 1101 | 5 |
| 1110 | 9 |
| 1111 | 9 |

PORT_4(g208)
PORT_3(g207)
PORT_2(g206)
PORT_1(g205)

1: ACTIVE PORT
0: NON-ACTIVE PORT

FIG.13

| port_active | COMBINATION-SPECIFIC MAX.JITTER |
|---|---|
| 1 0 0 0 | 0 |
| 1 0 0 1 | 2 |
| 1 0 1 0 | 6 |
| 1 0 1 1 | 6 |
| 1 1 0 0 | 3 |
| 1 1 0 1 | 3 |
| 1 1 1 0 | 9 |
| 1 1 1 1 | 9 |

→ PORT_4(g218)
→ PORT_3(g217)   { 1: ACTIVE PORT
→ PORT_2(g216)   { 0: NON-ACTIVE PORT
→ PORT_1(g215)

FIG.18

|  | PORT_1 (g305) | PORT_2 (g306) | PORT_3 (g307) | PORT_4 (g308) |
|---|---|---|---|---|
| PORT_1 (g305) | | | | |
| PORT_2 (g306) | 3 | | | |
| PORT_3 (g307) | 6 | 9 | | |
| PORT_4 (g308) | 2 | 5 | 8 | |

FIG.19

|  | PORT_1 (g305) | PORT_2 (g306) | PORT_3 (g307) | PORT_4 (g308) |
|---|---|---|---|---|
| PORT_1 (g305) | 1 |  |  |  |
| PORT_2 (g306) | 3 | 7 |  |  |
| PORT_3 (g307) | 6 | 9 | 10 |  |
| PORT_4 (g308) | 2 | 5 | 8 | 4 |

FIG.22

| | PORT_1 (g325) | PORT_2 (g326) | PORT_3 (g327) | PORT_4 (g328) | PORT_5 (g329) |
|---|---|---|---|---|---|
| PORT_1 (g325) | 1 | | | | |
| PORT_2 (g326) | 3 | 7 | | | |
| PORT_3 (g327) | 6 | 9 | 10 | | |
| PORT_4 (g328) | 11 | 5 | 8 | 4 | |
| PORT_5 (g329) | 2 | 6 | 8 | 3 | 4 |

FIG.24

| | PORT_1 (g405) | PORT_2 (g406) | PORT_3 (g407) | PORT_4 (g408) |
|---|---|---|---|---|
| PORT_1 (g405) | | | | |
| PORT_2 (g406) | 3 | | | |
| PORT_3 (g407) | 6 | 9 | | |
| PORT_4 (g408) | 2 | 5 | 8 | |

FIG.26

|  | PORT_1 (g415) | PORT_2 (g416) | PORT_3 (g417) | PORT_4 (g418) |
|---|---|---|---|---|
| PORT_1 (g415) | | | | |
| PORT_2 (g416) | (3) | | | |
| PORT_3 (g417) | 6 | 9 | | |
| PORT_4 (g418) | (2) | 5 | 8 | |

FIG.33
Conventional Art

| ADDRESS | \multicolumn{8}{c}{CONTENTS} | | | | | | | |
|---------|---|---|---|---|---|---|---|---|
| | 0 | 1 | 2 | 3 | 4 | 5 | 6 | 7 |
| 0000 | | | Physical_ID | | | | | PS |
| 0001 | RHB | IBR | | | Gap_count | | R | PS |
| 0010 | Extended(7) | | | | Total_ports | | | |
| 0011 | Max_speed | | | Delay | | | | |
| 0100 | LCtrl | Contender | Jitter | | | Pwr_class | | |
| 0101 | Watchdog | ISBR | Loop | Pwr_fail | Timeout | Port_event | Enab_accel | Enab_multi |
| 0110 | | | | | | Port_select | | |
| 0111 | Page_select | | | | | | | |
| 1000 | Register0(page_select) | | | | | | | |
| 1111 | Register7(page_select) | | | | | | | |

M: BUS MANAGER

FIG.35
Conventional Art

| ADDRESS | CONTENTS | | | | | | | |
|---|---|---|---|---|---|---|---|---|
| | 0 | 1 | 2 | 3 | 4 | 5 | 6 | 7 |
| 1000 | 4F | | | | | | | |
| 1001 | 50 | | | | | | | |
| 1010 | OP i.LINK version | | | | | | | |
| 1011 | Delay OP-DS | | | | Jitter OP-DS | | | Pinging |
| 1100 | Delay DS-DS | | | | Jitter DS-DS | | | |
| 1101 | T0 | T1 | T2 | T3 | T4 | T5 | T6 | T7 |
| 1110 | T8 | T9 | T10 | T11 | T12 | T13 | T14 | T15 |
| 1111 | Ping timer | | | | | | | |

FIG.36
Conventional Art

| Phy_ID | 10 | 0 | L | Gap_count | sp | rsv | c | pwr | p0 | p1 | p2 | i | m |
|---|---|---|---|---|---|---|---|---|---|---|---|---|---|
| Logical inverse of first quadlet |||||||||||||

SELF ID PACKET #0

| Phy_ID | 10 | 1 | n(0) | nsv | p3 | p4 | p5 | p6 | p7 | p8 | p9 | P1- | r | m |
|---|---|---|---|---|---|---|---|---|---|---|---|---|---|---|
| Logical inverse of first quadlet ||||||||||||||

SELF ID PACKET #1

| Phy_ID | 10 | 1 | n(1) | nsv | p11 | p12 | p13 | p14 | p15 | reserved |
|---|---|---|---|---|---|---|---|---|---|---|
| Logical inverse of first quadlet ||||||||||

SELF ID PACKET #2

__TRANSMITTER/RECEIVER APPARATUS__

The present application claims priority under 35 U.S.C. §119 to Japanese Patent Application No. 2002-224450, filed Aug. 1, 2002, the entire disclosure of which is hereby incorporated by reference.

BACKGROUND OF THE INVENTION

1. Field of the Invention

The present invention relates to transmitter/receiver apparatuses (such as personal computers, peripheral apparatuses thereof, and AV (audiovisual) equipment) incorporating a serial bus for serially transmitting a signal, for example a high-speed serial bus (hereinafter referred to as the "1394 serial bus") standardized in "IEEE Standard for a High Performance Serial Bus,"—IEEE Std. 1394a-2000 (hereinafter referred to as "IEEE Std. 1394a-2000") issued by IEEE (Institute of Electrical and Electronics Engineers).

2. Description of the Prior Art

First, IEEE Std. 1394a-2000 will be described. In recent years, networks for transmitting control signals and main signals between a personal computer and a peripheral device thereof, such as a printer, hard disk drive, or image scanner, or a visual device, such as a digital camera, or an audio device (hereinafter, such a terminal device will be referred to generically as a "node") have come to be increasingly built with nodes adopting the 1394 serial bus (hereinafter referred to as "1394 serial bus nodes").

FIG. 32 is a block diagram showing an example of a physical layer circuit complying with IEEE Std. 1394a-2000 (hereinafter referred to as a "1394 physical layer circuit). As shown in this figure, a conventional 1394 physical layer circuit includes a bus arbitration circuit 101, a DS-link encoder/decoder circuit 102, a link layer interface circuit 103, a register circuit 104, and three transceiver circuits 105, 106, and 107 complying with IEEE Std. 1394a-2000 (hereinafter referred to as the "1394 metal transceiver circuits 105, 106, and 107").

The bus arbitration circuit 101 makes various settings necessary for the operation of the 1394 physical layer circuit, and controls the timing with which data signals and control signals are output to the 1394 serial bus. To the bus arbitration circuit 101 is connected the register circuit 104, in which are stored the operation conditions under which the 1394 physical layer circuit should operate. Thus, the 1394 physical layer circuit operates under the conditions stored in the register circuit 104.

The DS-link encoder/decoder circuit 102 performs modulation and demodulation by the DS-link method in order to transmit and receive, over the bus, data signals from the upper layer called the link layer. The DS-link modulation is a method of modulation whereby a data signal [Data] and a strobe signal [Strobe], which is the exclusive OR of the data signal [Data] and a clock signal, are transmitted over two pairs of transmission lines.

The link layer interface circuit 103 is a circuit that exchanges data signals and control signals with the upper, link layer. The register circuit 104 is usually controlled by the upper, link layer, and the reading and rewriting of the contents stored in the register circuit 104 are performed from the link layer through the link layer interface circuit 103. The 1394 metal transceiver circuits 105, 106, and 107 each exchange main signals and control signals with an external node over two pairs of cables.

FIG. 33 is a register map showing the contents stored in the register circuit 104 (see IEEE Std. 1394a-2000, page 125). IEEE Std. 1394a-2000 prescribes that the contents shown in this register map be rewritable only under the control from the link layer. In the register map, to the delay region [Delay] at address 0011, bits 4 to 7 is assigned the value of the transmission delay through the 1394 physical layer circuit, and to the jitter region [Jitter] at address 0100, bits 2 to 4 is assigned the value of the jitter thereof. The description of other regions will be omitted.

Next, a description will be given of a type of node that mixedly has a plurality of ports with different transmission delays. In recent years, there have been moves to adopt IEEE Std. 1394a-2000 in a home network. However, IEEE Std. 1394a-2000 prescribes that the maximum length of metal cables be 4.5 [m], and this restriction on the cable length often proves to be inconvenient.

To overcome this, standards such as "IEEE Std. 1394b" and the "OP i.LINK" standard have been formulated according to which at least one of a plurality of 1394 metal transceivers included in a 1394 physical layer circuit is replaced with an optical transceiver or the like, and the metal cables used as the transmission lines for this transceiver are replaced with an optical fiber (such as a plastic optical fiber (POF)). This makes long-distance transmission possible.

According to these standards, one node may mixedly have metal and optical transceivers. In such a case, the node may need to convert signals for a metal port into signals for an optical port and perform other extra operation, and thus the optical port can have a sufficiently long transmission delay as compared with a DS port. Even with a node complying with IEEE Std. 1394a-2000, i.e., a node having no optical transceiver, there may be differences in transmission delay among different ports, because IEEE Std. 1394a-2000 prescribes only the maximum values for the transmission delay and other specifications of a port.

Next, a description will be given of optimization of the bus. To ensure that no different nodes output packets simultaneously to the bus, IEEE Std. 1394a-2000 prescribes bus idle times (hereinafter referred to as the "gaps") during which neither an arbitration signal nor any data signal can be transmitted. Such gaps are classified into the following four types: an acknowledge gap, which is the bus idle time between an asynchronous packet and an acknowledge packet; an isochronous gap, which is the bus idle time between an acknowledge gap and an isochronous packet; a subaction gap, which is the bus idle time between two isochronous packets; and an arbitration reset gap, which is the minimum bus idle time secured after arbitration until a port is permitted to compete for access to the bus (the bus idle time at the start of a fairness interval during which each node is permitted to transmit an asynchronous packet once). For each of these four types of gaps, IEEE Std. 1394a-2000 prescribes the minimum and maximum values.

Of the four types of gaps mentioned above, the acknowledge gap and isochronous gap are prescribed to be in the range from 0.04 [μs] to 0.05 [μs].

The subaction gap is prescribed to be in the range $$\text{from} \frac{(27 + \text{Gap\_count} \times 16)}{\text{BASE\_RATE}} - \text{PHY\_delay}_{max} \text{ to } \frac{(27 + \text{Gap\_count} \times 16)}{\text{BASE\_RATE}} + \text{PHY\_delay}_{min}$$

The arbitration reset gap is prescribed to be in the range $$\text{from} \frac{(51 + \text{Gap\_count} \times 32)}{\text{BASE\_RATE}} - \text{PHY\_delay}_{max} \text{ to } \frac{(53 + \text{Gap\_count} \times 32)}{\text{BASE\_RATE}} + \text{PHY\_delay}_{min}$$

The base rate [BASE_RATE] in the formulae above is a constant that takes a value in the range from 98.294 to 98.314 [Mbit/s]. Accordingly, to reduce these two types of gaps, it is necessary to reduce the gap count [Gap_count] and the physical layer delay [PHY_delay] in the formulae above. Here, the physical layer delay [PHY_delay] is the time required after a signal is input to a node until the signal is repeated. The gap count [Gap_count] is used for the purpose of producing gaps in such a way as to optimize the transmission efficiency according to the topology of the bus. Thus, by reducing the gap count [Gap_count] as much as possible, it is possible to enhance the transmission efficiency of the bus.

A node that manages the bus (hereinafter referred to as the "bus manager") can know, from a self ID packet, the topology of the bus and the physical layer delay [PHY_delay] of each node, and can calculate, by using formula (1) below, the transmission delay time [Round-trip_delay] corresponding to twice the signal transmission time through the longest path excluding the physical layers at both ends.

Round-trip_delay=2×(Hops−1)×(Cable_delay+PHY_delay)+2×Cable_delay (1)

The bus manager calculates the transmission delay through the longest path in different ways according to which of the following three types of topology is adopted: (a) the bus manager is a leaf node, and is located on the longest path; (b) the bus manger is not a leaf node, and is located on the longest path; and (c) the bus manager is not located on the longest path.

In all these cases, the bus manager measures the signal propagation time [Propagation time] (the total time of all the cable delays and physical layer delays along the path) between itself and a target node, and calculates, from the result of the measurement, the transmission delay time [Round-trip_delay]. Here, the bus manager measures the signal propagation time [Propagation time] by using the transmission time of a ping packet that requests a node to return a self ID packet within a predetermined time and the time [ping time] that elapses before a self ID packet is returned in response to the ping packet, on the basis of formulae (2) and (3) below.

Propagation time$_{min}$=Constant−RESPONSE_TIME$_{max}$−2×Σ(PHY jitter) (2)

Propagation time$_{max}$=Constant−RESPONSE_TIME$_{min}$+2×Σ(PHY jitter) (3)

The response time [RESPONSE_TIME] in the above formulae is defined by formula (4) below.

40 [ns]<RESPONSE_TIME<PHY_delay+100 [ns] (4)

Now, how the transmission delay time [Round-trip_delay] is calculated in each of the cases (a) to (c) above will be described in detail with reference to FIG. 34. FIG. 34 is a diagram showing an example of the bus topology used to calculate the transmission delay time [Round-trip_delay].

The case (a) corresponds to a case where only the node a and the bus manager M exist in FIG. 34. Accordingly, in this case, the bus manager M measures the transmission delay time [Round-trip_delay] by using formula (3) above.

The case (b) corresponds to a case where the path between the node α and the node γ is the longest path in FIG. 34. Accordingly, in this case, the bus manager M calculates, on the basis of formula (5) below, the transmission delay time [Round-trip_delay] by measuring the individual propagation times [Propagation time] between itself and each of the nodes α and γ and adding thereto its own physical layer delay [PHY_delay].

Round-trip_delay$_{(\alpha,\gamma)}$=Propagation time$_\alpha$+Propagation time$_\gamma$+2×PHY_delay$_M$ (5)

The case (c) corresponds to a case where the path between the node γ and the node δ is the longest path in FIG. 34. Accordingly, the bus manager M calculates, on the basis of the formula (6) below, the transmission delay time [Round-trip_delay] by measuring the individual propagation times [Propagation time] between itself and each of the nodes γ and δ and the propagation time [Propagation time] to the node located on the longest path and nearest to the bus manager M and then subtracting therefrom the doubly measured physical layer delay [PHY_delay].

Round-trip_delay$_{(\gamma,\delta)}$=Propagation time$_\gamma$+Propagation time$_\delta$+2×(Propagation time$_\beta$−PHY_delay$_\beta$)−240 ns (6)

By substituting the thus calculated transmission delay time [Round-trip_delay] in formula (7) below, it is possible to calculate the gap count [Gap_count] mentioned earlier.

$$\frac{BASE\_RATE_{max} \times \left(\frac{Round\text{-}trip\_delay_{max} + RESPONSE\_TIME_{j,max} -}{MIN\_IDLE\_TIME + PHY\_delay_{i,max}}\right) + 29 \times \frac{BASE\_RATE_{max}}{BASE\_RATE_{min}} - 51}{32 - 20 \times \frac{BASE\_RATE_{max}}{BASE\_RATE_{min}}} \quad (MIN\_IDLE\_TIME = 0.04\ [\mu s])$$ (7)

Next, a description will be given of the PHY register of a node complying with the OP i.LINK standard. To support optical ports complying with the OP i.LINK standard, the PHY register map according to this standard has some additional contents incorporated in the PHY register map complying with IEEE Std. 1394a-2000. With respect to the transmission delay and jitter of a node, the OP i.LINK page (see the OP i.LINK standard, ver. 2, page 85) shown in FIG. 35 is added to the base register shown in FIG. 33.

In the OP i.LINK page shown in FIG. 35, to the OP-DS region [Delay OP-DS] at address 1011, bits 0 to 3 is assigned the value of the maximum optical-port-to-DS-port transmission delay, and to the jitter OP-DS region [Jitter OP-DS] at address 1011, bits 4 to 7 is assigned the value of the maximum optical-port-to-DS-port jitter. Moreover, to the delay DS-DS region [Delay DS-DS] at the subsequent address, namely address 1100, bits 0 to 3 is assigned the value of the maximum DS-port-to-DS-port transmission delay, and to the jitter DS-DS region [Jitter DS-DS] at address 1100, bits 4 to 7 is assigned the value of the maximum DS-port-to-DS-port jitter.

Furthermore, to the regions [T0] to [T15] occupying addresses 1101 to 1110 is assigned information on whether a given port is an optical port complying with the OP i.LINK standard or a DS port. Incidentally, in the PHY register map (see FIG. 33), to the delay region [Delay] at address 0011, bits 4 to 7 is assigned the value of the maximum optical-port-to-optical-port transmission delay, and to the jitter region [Jitter] at address 0100, bits 2 to 4 is assigned the value of the maximum optical-port-to-optical-port jitter. The description of other regions will be omitted.

In a case where the bus manager, which manages the bus, is a node complying with the OP i.LINK standard, it first transmits a ping packet to a target node, and, by reading the p0 to pN fields of the self ID packets (see FIG. 36) returned therefrom, checks whether a given port is active or not. Moreover, the bus manager, by reading the regions [T0] to [T15] of the OP i.LINK page in the form of remote access packets, identifies the type of the port.

Now, consider a case where extension of the transmission distance is attempted, as described earlier, by replacing metal cables with optical fibers and replacing 1394 metal transceivers with optical transceivers. For example, in a node complying with IEEE Std. 1394a-2000 and having only DS ports, the transmission delays through the DS ports are sufficiently small, and the transmission delays through all the DS ports can be regarded as equal. Thus, any combination of these ports produces an equal physical layer delay [PHY_delay] and an equal physical layer jitter [PHY_jitter]. Accordingly, these values can be kept constant without any problem.

However, an optical port may have a larger transmission delay or a larger jitter as compared with a DS port, and the transmission delay and jitter of an optical port may vary according to the transmission speed at which it operates. As a result, different combinations of ports for conducting communication may produce different transmission delays or different jitters in a node. Thus, if the values of the transmission delay and jitter of a node are kept constant, it may be impossible to calculate the optimum signal propagation time [Propagation time]. Now, such situations will be described in more detail with reference to FIGS. 37 to 41.

First, a description will be given of the case shown in FIG. 37. A node A has four ports a101, a102, a103, and a104 each including a transmission delay in the physical layer, and it is assumed that their respective transmission delays have the relationship a102>a103>a104>a101. Moreover, it is assumed that, while the ports a101, a102, and a104 are active (in a state in which they can communicate with an external node), the port a103 is nonactive (in a state in which it cannot communicate with an external node, a state in which it is capable of communicating with an external node but is not connected to one, or a suspended state).

In this case, by the conventional method, the transmission delay of the node A is previously set equal to and kept constant at the transmission delay A1 between, among all the combinations of the ports a101 to a104, those producing the largest transmission delays, namely the ports a102 and a103. However, the port a103 is nonactive and is not being used, and therefore the actual maximum transmission delay of the node A is equal to the transmission delay A1 (<A1) between the ports a102 and a104. Thus, by the conventional method, the transmission delay of the node A is set unnecessarily large. Setting the transmission delay unnecessarily large in this way is inefficient, because doing so results in increasing the signal propagation time [Propagation time], and thus results in increasing the gap count [Gap_count] and hence the gaps themselves.

Next, a description will be given of the case shown in FIG. 38. A node B has three ports b101, b102, and b103 each including a transmission delay in the physical layer, and it is assumed that their respective transmission delays have the relationship b101>>b102>>b103. Moreover, it is assumed that the transmission delay B2 after a signal is input to the port b101 until the signal is output therefrom is larger than the transmission delay between any other combination of the ports.

In this case, by the conventional method, the transmission delay of the node B is previously set equal to and kept constant at the transmission delay B1 between, among all the combinations of the ports b101 to b103, those producing the largest transmission delays, namely the ports b101 and b102. However, when a signal input to the port b101 is output therefrom, the actual transmission delay B2 is larger than the transmission delay B1 previously set as the transmission delay of the node B. This makes the gap count [Gap_count] smaller than the appropriate value, and thus may make it impossible to secure sufficient gaps.

Next, a description will be given of the case shown in FIG. 39. In a case as shown in this figure where the bus manager BM is not on the longest path, as described earlier, it is possible to calculate the transmission delay time [Round-trip_delay] by using formula (6) noted earlier.

In this case, by the conventional method, the transmission delay of the node is set equal to the maximum port-to-port transmission delay. Thus, the value of PHY_delay_{Node_C0} is set equal to a transmission delay unrelated to the transmission delay C3, i.e., a transmission delay different from PHY_delay_{Node_C0} as intended by formula (6). Setting the transmission delay at an unintended value in this way is inefficient, because doing so results in increasing the signal propagation time [Propagation time], and thus results in increasing the gap count [Gap_count] and hence the gaps themselves.

Incidentally, as described earlier, in a node complying with the OP i.LINK standard, the value of the optical-port-to-optical-port transmission delay is stored in the delay region allocated in its base register, and the values of the optical-port-to-DS-port and DS-port-to-DS-port transmission delays are stored in the delay OP-DS region and delay DS-DS region, respectively, allocated in the OP i.LINK page (see FIG. 35). Accordingly, in a case where the bus manager located on the bus is a node complying with the OP i.LINK standard, the bus manager can read out not only the value of the optical-port-to-optical-port transmission delay stored in the base register but also the values of the optical-port-to-DS-port and DS-port-to-DS-port transmission delays stored in the OP i.LINK page.

However, in a case where the bus manager located on the bus is a node that does not comply with the OP i.LINK standard, the bus manager can read out only the value of the optical-port-to-optical-port transmission delay stored in the base register. Accordingly, when only a DS port is active in a node complying with the OP i.LINK standard and having an optical port, the bus manager, which does not comply with the OP i.LINK standard, recognizes as the transmission delay of the node not the DS-port-to-DS-port transmission delay but the optical-port-to-optical-port transmission delay, which is larger that the former. Setting the transmission delay unnecessarily large in this way is inefficient, because doing so results in increasing the gap count [Gap_count] and hence the gaps themselves.

Next, a description will be given of the case shown in FIG. 40. A node E has four ports e101, e102, e103, and e104 each including a transmission delay in the physical layer. It is assumed that, while the ports e101, e102, and e104 are active, the port e103 is nonactive.

In this case, by the conventional method, if, among all the combinations of the ports e101 to e104, the combination of the ports e102 and e103 produces the largest jitter, the jitter of the node E is previously set equal to and kept constant at that jitter E1. However, the port e103 is nonactive and is not being used, and therefore, by the conventional method, the jitter of the node E is set unnecessarily large. Setting the jitter unnecessarily large in this way is inefficient, because doing so results in increasing the gap count [Gap_count] and hence the gaps themselves.

Lastly, a description will be given of the case shown in FIG. 41. The node F_0 shown in this figure is ready for communication, with its ports f101, f102, f103, and f104 connected to nodes F_1, F_2, F_3, and F_4, respectively. It is assumed that, among those combinations of the ports which include the port f101, the combination of the ports f101 and f102 produces the largest jitter F1, and that, among all the combinations of the ports f101 to f104, the combination of the ports f102 and f103 produces the largest jitter F2.

In this case, by the conventional method, the jitter of the node F_0 is previously set equal to and kept constant at the largest jitter F2 among all the combinations of the ports. However, the value needed to calculate the signal propagation time [Propagation time] is the largest jitter among those combinations of the ports which include the port to which a signal is input. Thus, for example, when a control signal is input via the port f101 connected to the node F_1, by the conventional method, the jitter of the node F_0 is set unnecessarily large. Setting the jitter unnecessarily large in this way is inefficient, because doing so results in increasing the gap count [Gap_count] and hence the gaps themselves.

As described earlier, in a node complying with the OP i.LINK standard, the value of the optical-port-to-optical-port jitter is stored in the jitter region allocated in its base register, and the values of the optical-port-to-DS-port and DS-port-to-DS-port jitters are stored in the jitter OP-DS region and jitter DS-DS region, respectively, allocated in the OP i.LINK page (see FIG. 35). Accordingly, in a case where the bus manager located on the bus is a node complying with the OP i.LINK standard, the bus manager can read out not only the value of the optical-port-to-optical-port jitter stored in the base register but also the values of the optical-port-to-DS-port and DS-port-to-DS-port jitters stored in the OP i.LINK page.

However, in a case where the bus manager located on the bus is a node that does not comply with the OP i.LINK standard, the bus manager can read out only the value of the optical-port-to-optical-port jitter stored in the base register. Accordingly, when only a DS port is active in a node complying with the OP i.LINK standard and having an optical port, the bus manager, which does not comply with the OP i.LINK standard, recognizes as the jitter of the node not the DS-port-to-DS-port jitter but the optical-port-to-optical-port jitter, which is larger that the former. Setting the jitter unnecessarily large in this way is inefficient, because doing so results in increasing the gap count [Gap_count] and hence the gaps themselves.

SUMMARY OF THE INVENTION

An object of the present invention is to provide a transmitter/receiver apparatus that permits efficient communication.

To achieve the above object, according to the present invention, a transmitter/receiver apparatus is provided with: a plurality of ports of different types; a bus arbitration circuit that controls the timing with which signals are output from the individual ports to a serial bus; a register in which are stored the conditions under which the bus arbitration circuit should operate; and a delay value optimizing processor that monitors the individual ports and optimizes the transmission delay value of the transmitter/receiver apparatus according to the operation status of the individual ports.

BRIEF DESCRIPTION OF THE DRAWINGS

This and other objects and features of the present invention will become clear from the following description, taken in conjunction with the preferred embodiments with reference to the accompanying drawings in which:

FIG. 2 is a data map showing the contents stored in the reference table g101 (in the first embodiment);

FIG. 3 is a data map showing the contents stored in the reference table g101 (in the second embodiment);

FIG. 6 is a data map showing the contents stored in the reference table g121;

FIG. 11 is a data map showing the contents stored in the reference table g201;

FIG. 13 is a data map showing the contents stored in the reference table g211;

FIG. 18 is a data map showing the contents stored in the reference table g301 (in the twelfth embodiment);

FIG. 19 is a data map showing the contents stored in the reference table g301 (in the thirteenth embodiment);

FIG. 22 is a data map showing the contents stored in the reference table g321;

FIG. 24 is a data map showing the contents stored in the reference table g401;

FIG. 26 is a data map showing the contents stored in the reference table g411;

FIG. 33 is a register map showing the contents stored in the register circuit 104;

FIG. 35 is a register map of the OP i.LINK page prescribed in the OP i.LINK standard;

FIG. 36 is a diagram showing the contents of the self ID packets;

DESCRIPTION OF THE PREFERRED EMBODIMENTS

Hereinafter, transmitter/receiver apparatuses embodying the present invention will be described in detail.

First Embodiment

Figure 1:
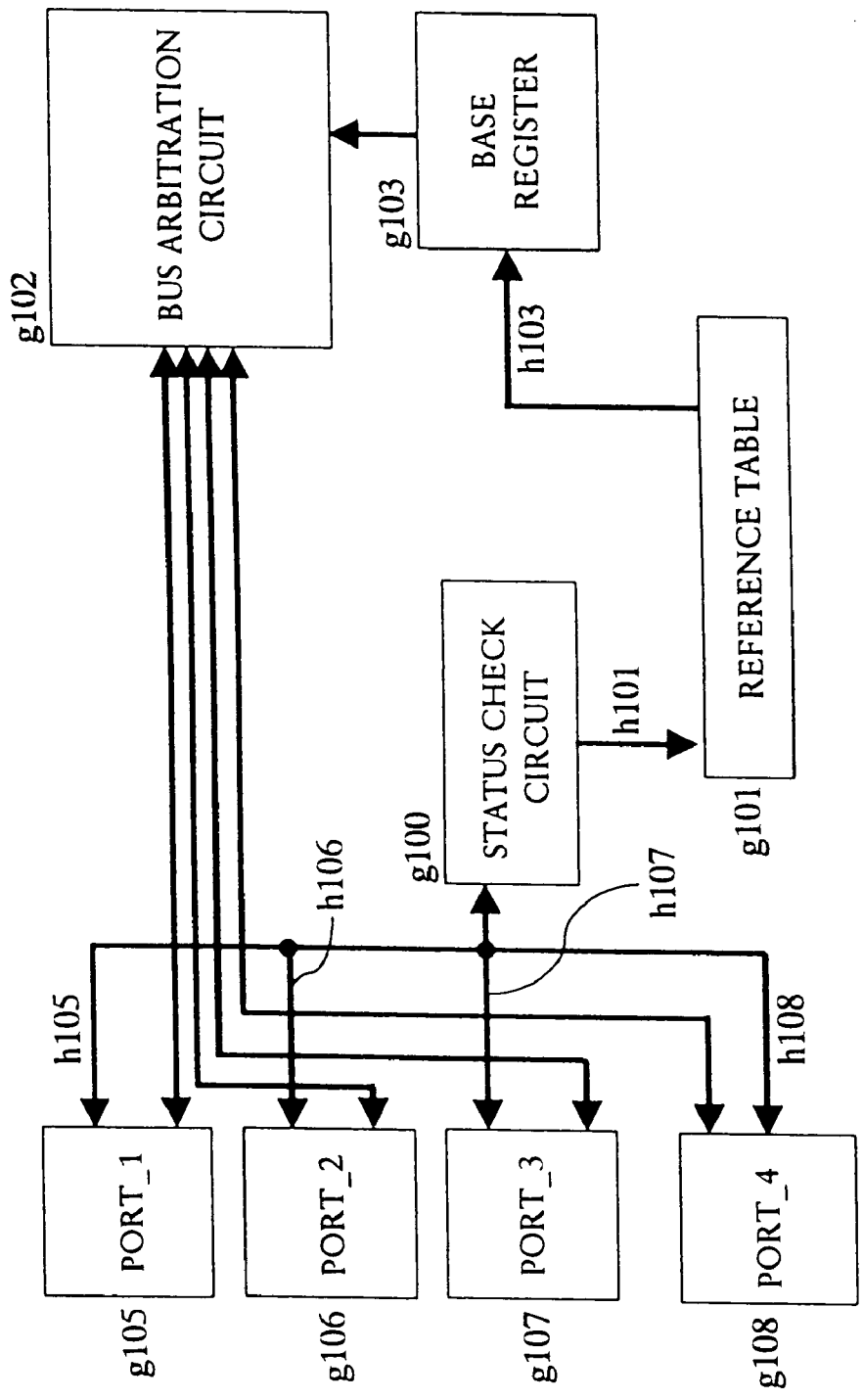
FIG. 1 is a block diagram showing the transmitter/receiver apparatus of a first and a second embodiment of the invention.

First, the transmitter/receiver apparatus of a first embodiment of the invention will be described in detail with reference to FIGS. 1 and 2. FIG. 1 is a block diagram showing the transmitter/receiver apparatus of the first embodiment of the invention. The transmitter/receiver apparatus of this embodiment complies with IEEE Std. 1394a-2000, and is composed of, as shown in the figure, a status check circuit g100, a reference table g101, a bus arbitration circuit g102, a base register g103, and four ports g105, g106, g107, and g108.

The status check circuit g100 checks whether the individual ports g105 to g108 are active or not on the basis of the status signals obtained by way of signal lines h105, h106, h107, and h108, and outputs the result of the checks (the combination of active ports) to the reference table g101 by way of a signal line h101.

The reference table g101 holds, among the transmission delay values between the individual ports g105 to g108, the maximum values corresponding to different combinations of active ports. A value read out from this reference table g101 according to the output signal (the combination of active ports) of the status check circuit g100 is assigned, by way of a signal line h103, to the delay region (see FIG. 33) of the base register g103.

The bus arbitration circuit g102 arbitrates conflicts for the access to an IEEE serial bus. Moreover, to the bus arbitration circuit g102 is connected the base register g103, in which are stored the conditions under which the transmitter/receiver apparatus should operate. Thus, the transmitter/receiver apparatus operates under the conditions stored in the base register g103. The ports g105 to g108 each exchange signals with an external node.

FIG. 2 is a data map showing the contents stored in the reference table g101. In this data map, the port active value

[port_active] is a parameter that represents the combination of active ports, with its first (highest) to fourth (lowest) bits representing the status of the ports g105 to g108, respectively. Here, in each bit position, the value "1" indicates an active port, and the value "0" indicates a nonactive port. For example, a port active value "1101" indicates that the ports g105, g106, and g108 are active and the port g107 is nonactive.

Moreover, in this data map are stored, among the transmission delay values between the individual ports g105 to g108, the maximum values corresponding to different combinations of active ports, so as to correspond one-to-one to the port active values [port_active] mentioned above (what is dealt with here is not the transmission delay values themselves but values calculated from the actual transmission delay values according to a predetermined calculation formula, and larger values represent larger transmission delays; this applies throughout the following descriptions). Thus, the transmission delay values stored in this data map do not include any transmission delay value involving a nonactive port. When no transmission delay value is available for a given combination of active ports, the value "0" is assigned as the maximum transmission delay value corresponding to that combination for convenience' sake.

In the transmitter/receiver apparatus configured as described above, consider, for example, a case where the ports g105, g106, and g108 are active and the port g107 is nonactive. In this case, by the conventional method, the transmission delay of the node is set equal to and kept constant at the maximum transmission delay value among all the combinations of the ports including the nonactive port g107, namely "9" (i.e., the value that is stored as corresponding to the port active value "1111" in the reference table g101 and that is the transmission delay value between the ports g106 and g107). By contrast, in the transmitter/receiver apparatus of this embodiment, the maximum value among the combinations of the ports excluding the nonactive port g107, namely "5" (i.e., the value that is stored as corresponding to the port active value "1101" in the reference table g101 and that is the transmission delay value between the ports g106 and g108) is selected as the transmission delay value of the node, and is assigned to the delay region of the base register g103.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Second Embodiment

Next, the transmitter/receiver apparatus of a second embodiment of the invention will be described. The transmitter/receiver apparatus of this embodiment has the same block configuration (see FIG. 1) as that of the first embodiment described above, but differs therefrom in that the maximum transmission delay values stored one for each of the port active values [port_active] in the reference table g101 are whichever are larger between, among the transmission delay values between the individual ports g105 to g108, the maximum values corresponding to different combinations of active ports and, among the transmission delay values required for the individual ports g105 to g108 to handle signal input and output singly (i.e., the transmission delay value after a control signal is input to a given port until the port returns a control signal in response to the control signal), the maximum values corresponding to different combinations of active ports.

For example, if it is assumed that the transmission delay values between the individual ports g105 to g108 are the same as in the first embodiment (see FIG. 2), and that the transmission delay values required for the individual ports g105 to g108 to handle signal input/output singly are "1," "7," "10," and "4," respectively, then the data map shown in FIG. 3 is stored in the reference table g101.

With this configuration, even when signal input and output are handled by a single port, it is possible to avoid setting the transmission delay value of the transmitter/receiver apparatus unduly small. This helps secure a sufficient gap count [Gap_count] and hence sufficient gaps and thereby conduct communication surely.

Figure 4:
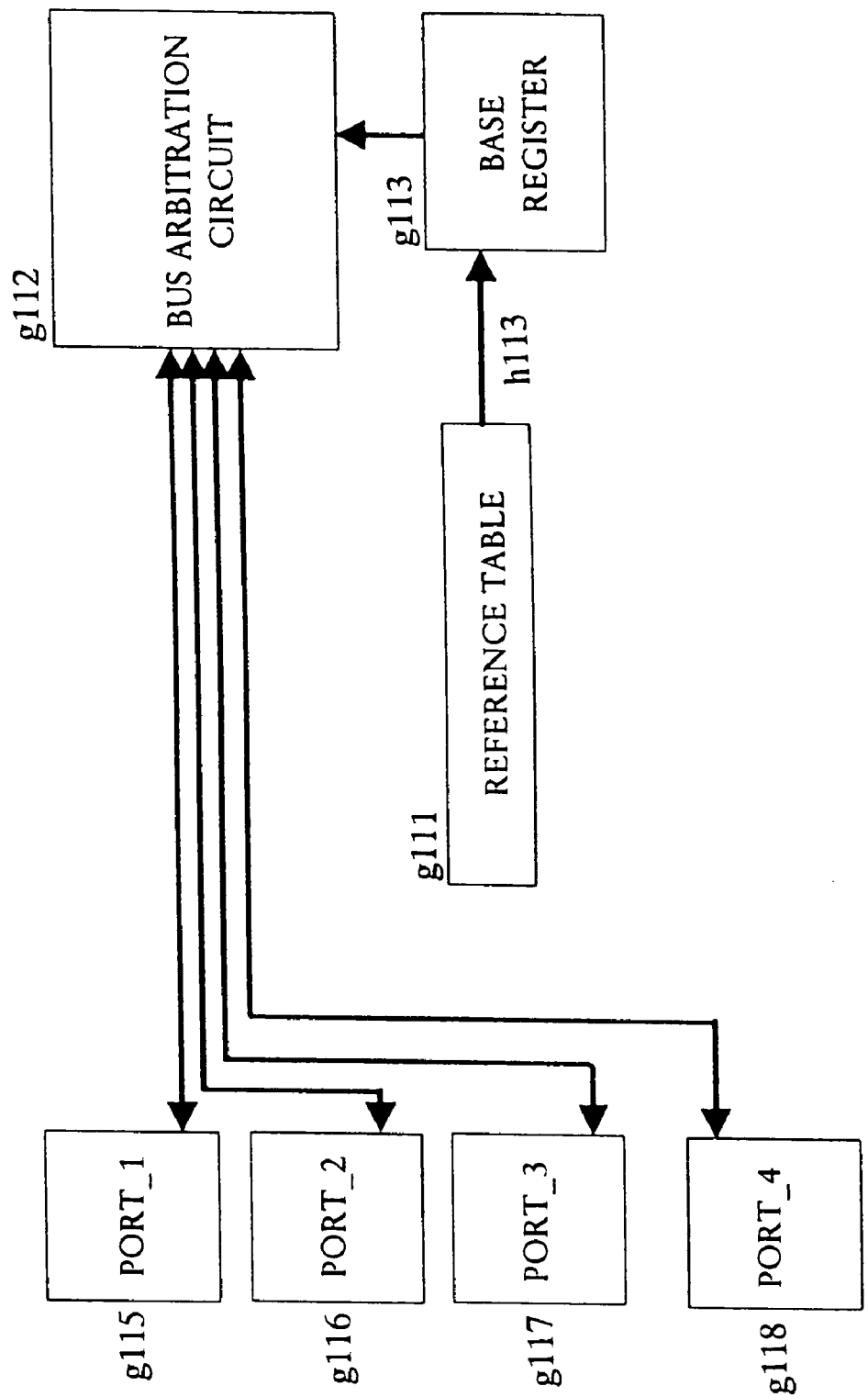
FIG. 4 is a block diagram showing another example of the configuration of the transmitter/receiver apparatus of the second embodiment.

In a case where whether the ports are active or not is not checked, it is possible to omit the status check circuit from the configuration shown in FIG. 1 (see FIG. 4). In this case, in the reference table g111 is stored only the maximum value among the transmission delay values between the individual ports g115 to g118 and the transmission delay values required for the individual ports g115 to g118 to handle signal input and output singly (i.e., the value stored as corresponding to the part active value "1111"; see FIG. 3).

Third Embodiment

Figure 5:
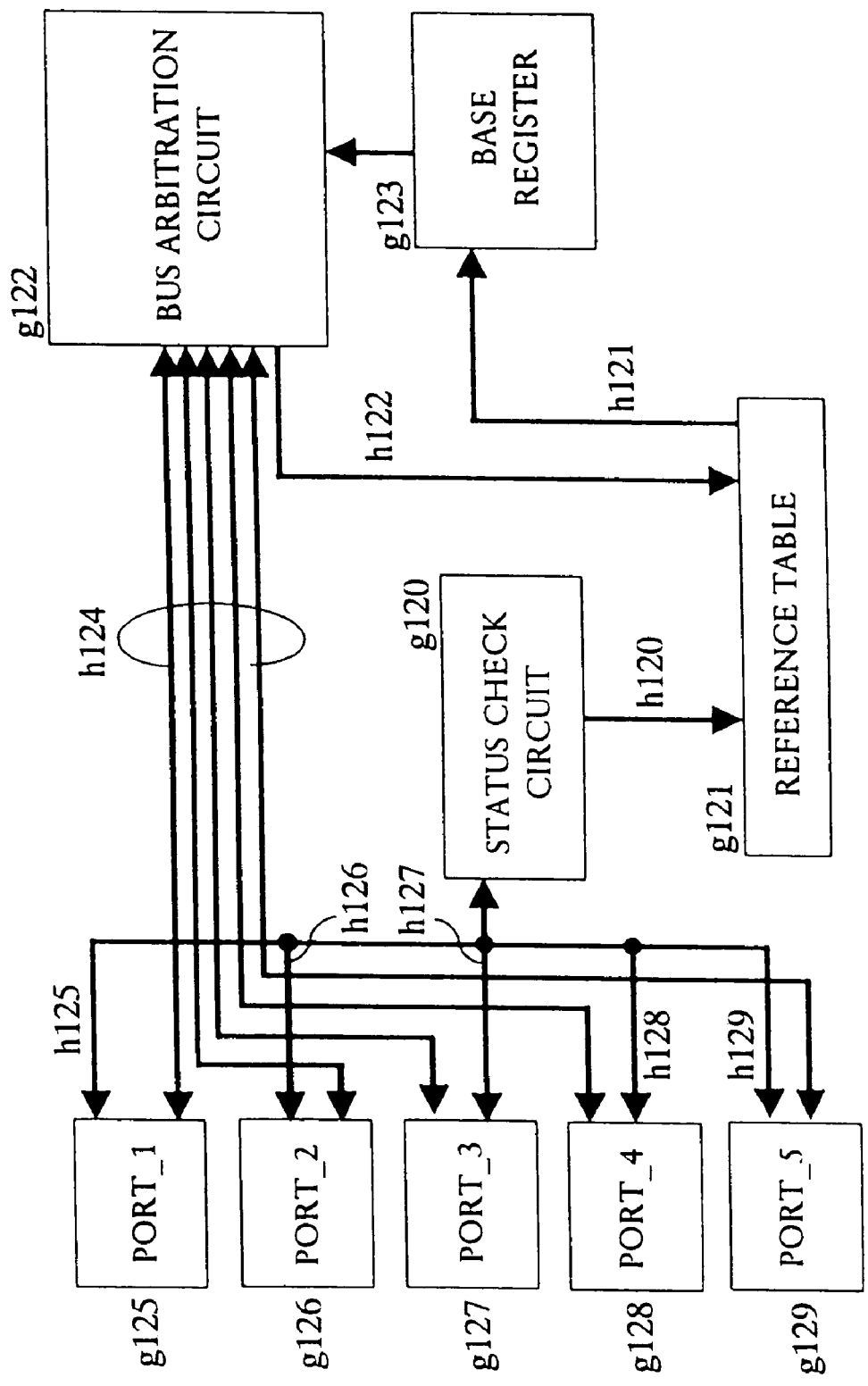
FIG. 5 is a block diagram showing the transmitter/receiver apparatus of a third embodiment of the invention.

Next, the transmitter/receiver apparatus of a third embodiment of the invention will be described in detail with reference to FIGS. 5 and 6. FIG. 5 is a block diagram showing the transmitter/receiver apparatus of the third embodiment of the invention. The transmitter/receiver apparatus of this embodiment complies with IEEE Std. 1394a-2000, and is composed of, as shown in the figure, a status check circuit g120, a reference table g121, a bus arbitration circuit g122, a base register g123, and five ports g125, g126, g127, g128, and g129.

The status check circuit g120 checks whether the individual ports g125 to g129 are active or not on the basis of the status signals obtained by way of signal lines h125, h126, h127, h128, and h129, and outputs the result of the checks (the combination of active ports) to the reference table g121 by way of a signal line h120.

The bus arbitration circuit g122 arbitrates conflicts for the access to an IEEE serial bus, and exchanges signals with the individual ports g125 to g129 by way of a signal line h124. Here, the bus arbitration circuit g122 checks from which port it has received a signal, and outputs the result of the check (information on the input port) to the reference table g121 by way of a signal line h122. Moreover, to the bus arbitration circuit g122 is connected the base register g123, in which are stored the conditions under which the transmitter/receiver apparatus should operate. Thus, the transmitter/receiver apparatus operates under the conditions stored in the base register g123. The ports g125 to g129 each exchange signals with an external node.

The reference table g121 holds, for each of the ports g125 to g129, whichever are larger between, among the transmission delay values between the individual ports other than that port, the maximum values corresponding to different combinations of active ports and the transmission delay value required for that port to handle signal input and output singly. A value read out from this reference table g121 according to the output signal (the combination of active ports) of the status check circuit g120 and the information on the input port obtained from the bus arbitration circuit g122 is assigned, by way of a signal line h121, to the delay region (see FIG. 33) of the base register g123.

FIG. 6 is a data map showing the contents stored in the reference table g121. It is to be noted that this figure shows, of all the data maps stored one for each of the ports g125 to g129, the one that is referred to when a control signal is input via the port g125. In this figure, the port active value [port_active] is a parameter that represents the combination of active ports, with its first (highest) to fifth (lowest) bits representing the status of the ports g125 to g129, respectively. Here, in each bit position, the value "1" indicates an active port, and the value "0" indicates a nonactive port. For example, a port active value "11110" indicates that the ports g125 to g128 are active and the port g129 is nonactive.

Moreover, in this data map are stored whichever are larger between, among the transmission delay values between the individual ports g126 to g129 other than the port g125, the maximum values corresponding to different combinations of active ports and the transmission delay value required for the port g125 to handle signal input and output singly, so as to correspond one-to-one to the port active values [port_active] mentioned above. Thus, the transmission delay values stored in this data map do not include any transmission delay value between the signal input port g125 and a nonactive port, between the signal input port g125 and another active port, or required for another active port to handle signal input/output singly. This permits more efficient setting of the transmission delay value than in the first embodiment.

In the transmitter/receiver apparatus configured as described above, consider, for example, a case where the ports other than the port g129 are active and a signal is input to the port g125. In this case, by the conventional method, the transmission delay value of the node is set equal to and kept constant at the maximum transmission delay value among all the combinations of the ports including the nonactive port g129. By contrast, in the transmitter/receiver apparatus of this embodiment, whichever is larger between the maximum transmission delay value between the ports g126 to g128 excluding the signal input port g125 and the transmission delay value required for the signal input port g125 to handle signal input and output singly, namely "10" (i.e., the value stored as corresponding to the port active value "11110" in the reference table g121), is selected as the transmission delay value of the node, and is assigned to the delay region of the base register g123.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Fourth Embodiment

Figure 7:
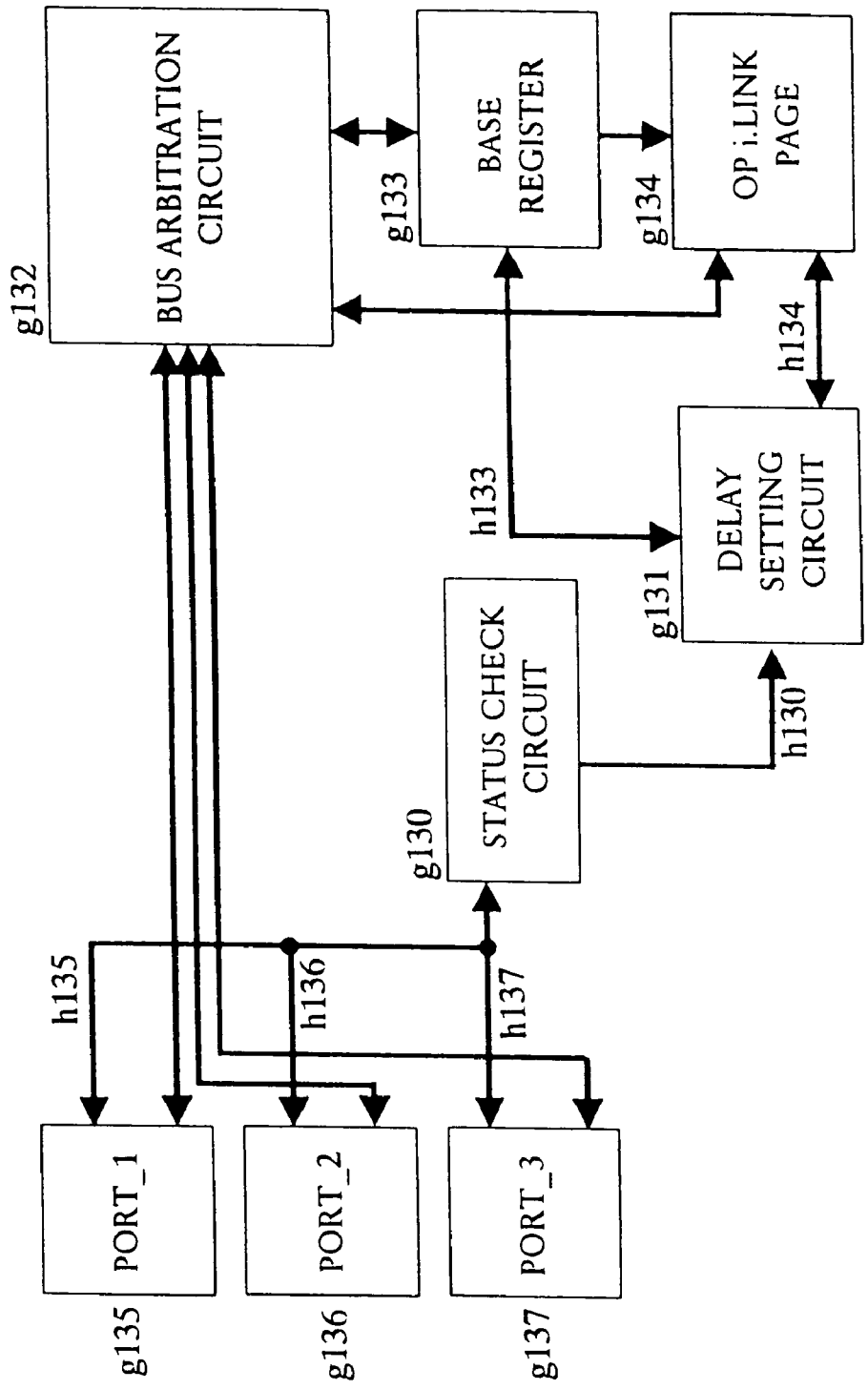
FIG. 7 is a block diagram showing the transmitter/receiver apparatus of a fourth embodiment of the invention.

Next, the transmitter/receiver apparatus of a fourth embodiment of the invention will be described in detail with reference to FIG. 7. FIG. 7 is a block diagram showing the transmitter/receiver apparatus of the fourth embodiment of the invention. The transmitter/receiver apparatus of this embodiment complies with the OP i.LINK standard, and is composed of, as shown in the figure, a status check circuit g130, a delay setting circuit g131, a bus arbitration circuit g132, a base register g133, an OP i.LINK page g134, and three ports g135, g136, and g137.

The status check circuit g130 checks whether the individual ports g135 to g137 are active or not on the basis of the status signals obtained by way of signal lines h135, h136, and h137, and outputs the result of the checks (the combination of active ports) to the delay setting circuit g131 by way of a signal line h130.

The delay setting circuit g131 refers to the output signal (the combination of active ports) of the status check circuit g130 and the OP i.LINK page g134, and, if only DS ports are found active, the delay setting circuit g131 reads out the value stored in the delay DS-DS region (see FIG. 35) of the OP i.LINK page g134 and assigns it to the delay region (see FIG. 33) of the base register g133 by way of signal lines h134 and h133.

The bus arbitration circuit g132 arbitrates conflicts for the access to a bus. Moreover, to the bus arbitration circuit g132 are connected the base register g133 and the OP i.LINK page g134, in both of which are stored the conditions under which the transmitter/receiver apparatus should operate. Thus, the transmitter/receiver apparatus operates under the conditions stored in the two registers g133 and g134. The ports g135 to g137 each exchange signals with an external node.

In the transmitter/receiver apparatus configured as described above, consider a case where only DS ports are active. In this case, by the conventional method, if the bus is managed by a bus manager that does not comply with the OP i.LINK standard, the transmission delay of the node is set equal not to the DS-port-to-DS-port transmission delay but to the optical-port-to-optical-port transmission delay, which is larger than the former. By contrast, in the transmitter/receiver apparatus of this embodiment, according to the output signal of the status check circuit g130 and the OP i.LINK page g134, it is recognized that only DS ports are active, and the value stored in the delay DS-DS region of the OP i.LINK page g134 is assigned to the delay region of the base register g133.

With this configuration, even if the bus manager does not comply with the OP i.LINK standard, when only DS ports of a node are active, the transmission delay value of the node can be set equal to the DS-port-to-DS-port transmission delay value. This helps optimize the gap count [Gap_count] and hence the gaps themselves and thereby conduct communication efficiently.

Fifth Embodiment

Figure 8:
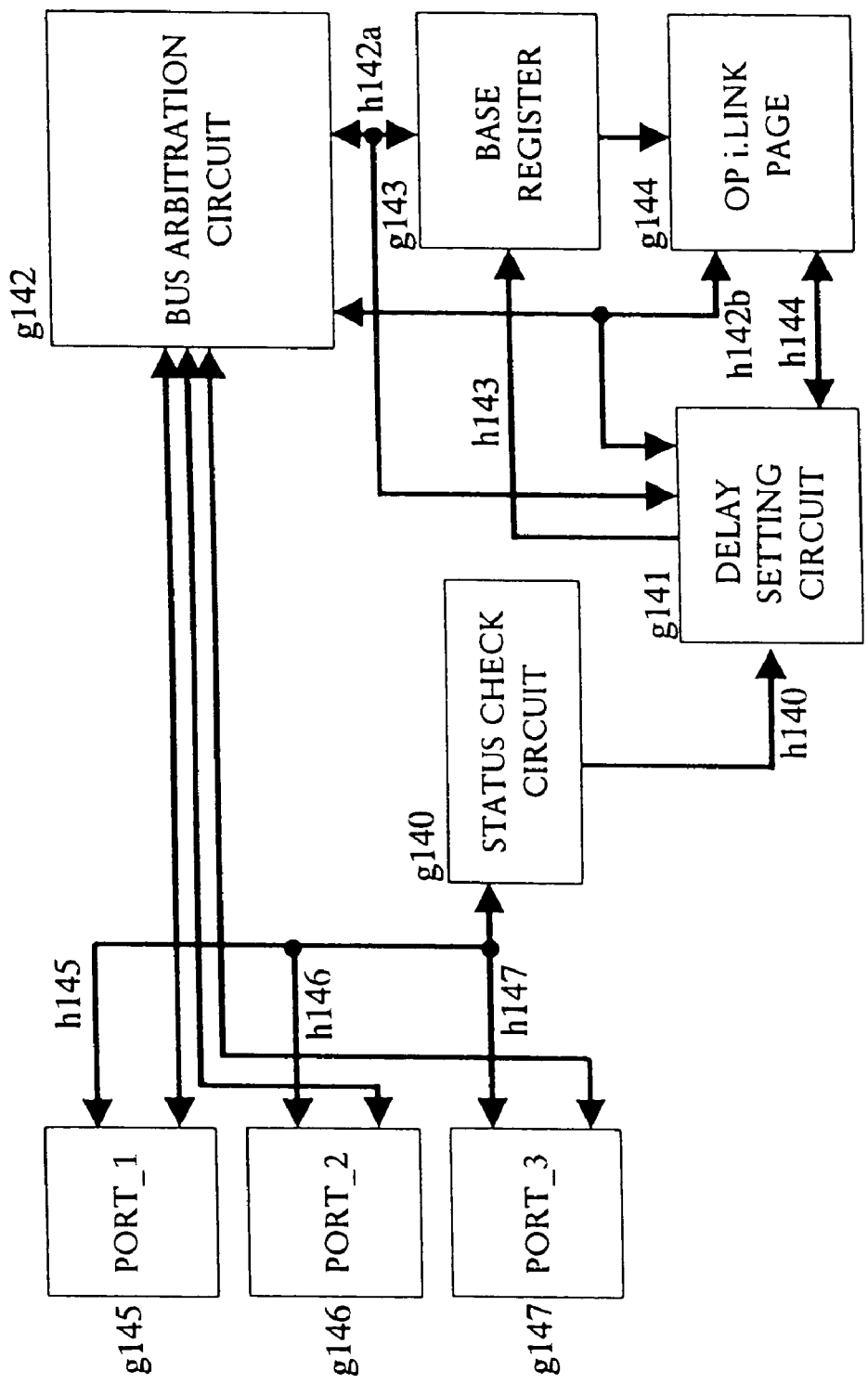
FIG. 8 is a block diagram showing the transmitter/receiver apparatus of a fifth embodiment of the invention.

Next, the transmitter/receiver apparatus of a fifth embodiment of the invention will be described in detail with reference to FIG. 8. FIG. 8 is a block diagram showing the transmitter/receiver apparatus of the fifth embodiment of the invention. The transmitter/receiver apparatus of this embodiment complies with the OP i.LINK standard, and is composed of, as shown in the figure, a status check circuit g140, a delay setting circuit g141, a bus arbitration circuit g142, a base register g143, an OP i.LINK page g144, and three ports g145, g146, and g147.

The status check circuit g140 checks whether the individual ports g145 to g147 are active or not on the basis of the status signals obtained by way of signal lines h145, h146, and h147, and outputs the result of the checks (the combination of active ports) to the delay setting circuit g141 by way of a signal line h140.

The delay setting circuit g141 refers to the output signal (the combination of active ports) of the status check circuit g140 and the OP i.LINK page g144, and monitors signal lines h142a and h142b by way of which the bus arbitration circuit g142 is connected to the base register g143 and the OP i.LINK page g144, respectively, so that, when only DS ports are active, if not the OP i.LINK page g144 but only the base register g143 is accessed by a remote access packet from an external node (bus manager), the delay setting circuit g141 reads out the value stored in the delay DS-DS region (see FIG. 35) of the OP i.LINK page g144 and assigns it to the delay region (see FIG. 33) of the base register g143 by way of signal lines H144 and H143.

The bus arbitration circuit g142 arbitrates conflicts for the access to a bus. Moreover, to the bus arbitration circuit g142 are connected the base register g143 and the OP i.LINK page g144, in both of which are stored the conditions under which the transmitter/receiver apparatus should operate. Thus, the transmitter/receiver apparatus operates under the conditions stored in the two registers g143 and g144. The ports g145 to g147 each exchange signals with an external node.

In the transmitter/receiver apparatus configured as described above, consider a case where only DS ports are active. In this case, by the conventional method, if the bus is managed by a bus manager that does not comply with the OP i.LINK standard, the transmission delay of the node is set equal not to the DS-port-to-DS-port transmission delay but to the optical-port-to-optical-port transmission delay, which is larger than the former. By contrast, in the transmitter/receiver apparatus of this embodiment, as soon as, according to the output signal of the status check circuit g140 and the OP i.LINK page g144, it is recognized that only DS ports are active, and in addition, according to the result of the monitoring of the signal lines h142a and h142b, it is recognized that not the OP i.LINK page g144 but only the base register g143 is accessed from an external node (bus manager), the value stored in the delay DS-DS region of the OP i.LINK page g144 is assigned to the delay region of the base register g143.

With this configuration, even if the bus manager does not comply with the OP i.LINK standard, when only DS ports of a node are active, the transmission delay value of the node can be set equal to the DS-port-to-DS-port transmission delay value. This helps optimize the gap count [Gap_count] and hence the gaps themselves and thereby conduct communication efficiently.

Sixth Embodiment

Figure 9:
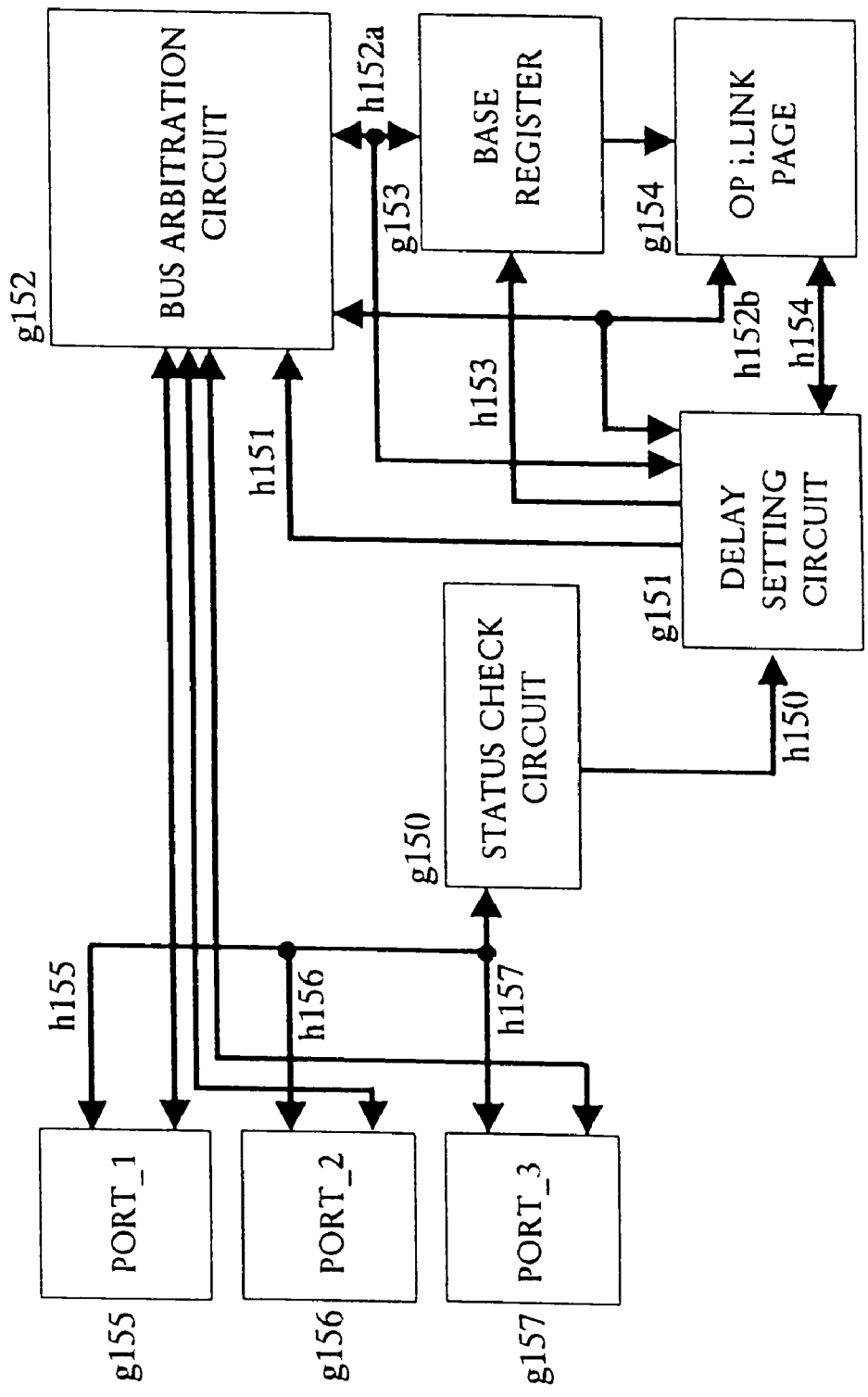
FIG. 9 is a block diagram showing the transmitter/receiver apparatus of a sixth embodiment of the invention.

Next, the transmitter/receiver apparatus of a sixth embodiment of the invention will be described in detail with reference to FIG. 9. FIG. 9 is a block diagram showing the transmitter/receiver apparatus of the sixth embodiment of the invention. The transmitter/receiver apparatus of this embodiment complies with the OP i.LINK standard, and is composed of, as shown in the figure, a status check circuit g150, a delay setting circuit g151, a bus arbitration circuit g152, a base register g153, an OP i.LINK page g154, and three ports g155, g156, and g157.

The status check circuit g150 checks whether the individual ports g155 to g157 are active or not on the basis of the status signals obtained by way of signal lines h155, h156, and h157, and outputs the result of the checks (the combination of active ports) to the delay setting circuit g151 by way of a signal line h150.

The delay setting circuit g151 refers to the output signal (the combination of active ports) of the status check circuit g150 and the OP i.LINK page g154, and monitors signal lines h152a and h152b by way of which the bus arbitration circuit g152 is connected to the base register g153 and the OP i.LINK page g154, respectively, so that, when only DS ports are active, if not the OP i.LINK page g154 but only the base register g153 is accessed by a remote access packet from an external node (bus manager), the delay setting circuit g151 reads out the value stored in the delay DS-DS region (see FIG. 35) of the OP i.LINK page g154 and outputs it to the bus arbitration circuit g152 by way of a signal line h151 so as to assign it to a predetermined data region of a remote reply packet that is returned to the external node.

The bus arbitration circuit g152 arbitrates conflicts for the access to a bus. Moreover, to the bus arbitration circuit g152 are connected the base register g153 and the OP i.LINK page g154, in both of which are stored the conditions under which the transmitter/receiver apparatus should operate. Thus, the transmitter/receiver apparatus operates under the conditions stored in the two registers g153 and g154. The ports g155 to g157 each exchange signals with an external node.

In the transmitter/receiver apparatus configured as described above, consider a case where only DS ports are active. In this case, by the conventional method, if the bus is managed by a bus manager that does not comply with the OP i.LINK standard, the transmission delay of the node is set equal not to the DS-port-to-DS-port transmission delay but to the optical-port-to-optical-port transmission delay, which is larger than the former. By contrast, in the transmitter/receiver apparatus of this embodiment, as soon as, according to the output signal of the status check circuit g150 and the OP i.LINK page g154, it is recognized that only DS ports are active, and in addition, according to the result of the monitoring of the signal lines h152a and h152b, it is recognized that not the OP i.LINK page g154 but only the base register g153 is accessed from an external node (bus manager), the value stored in the delay DS-DS region of the OP i.LINK page g154 is assigned to a predetermined data region of a remote reply packet.

With this configuration, even if the bus manager does not comply with the OP i.LINK standard, when only DS ports of a node are active, the transmission delay value of the node can be set equal to the DS-port-to-DS-port transmission delay value. This helps optimize the gap count [Gap_count] and hence the gaps themselves and thereby conduct communication efficiently.

Seventh Embodiment

Figure 10:
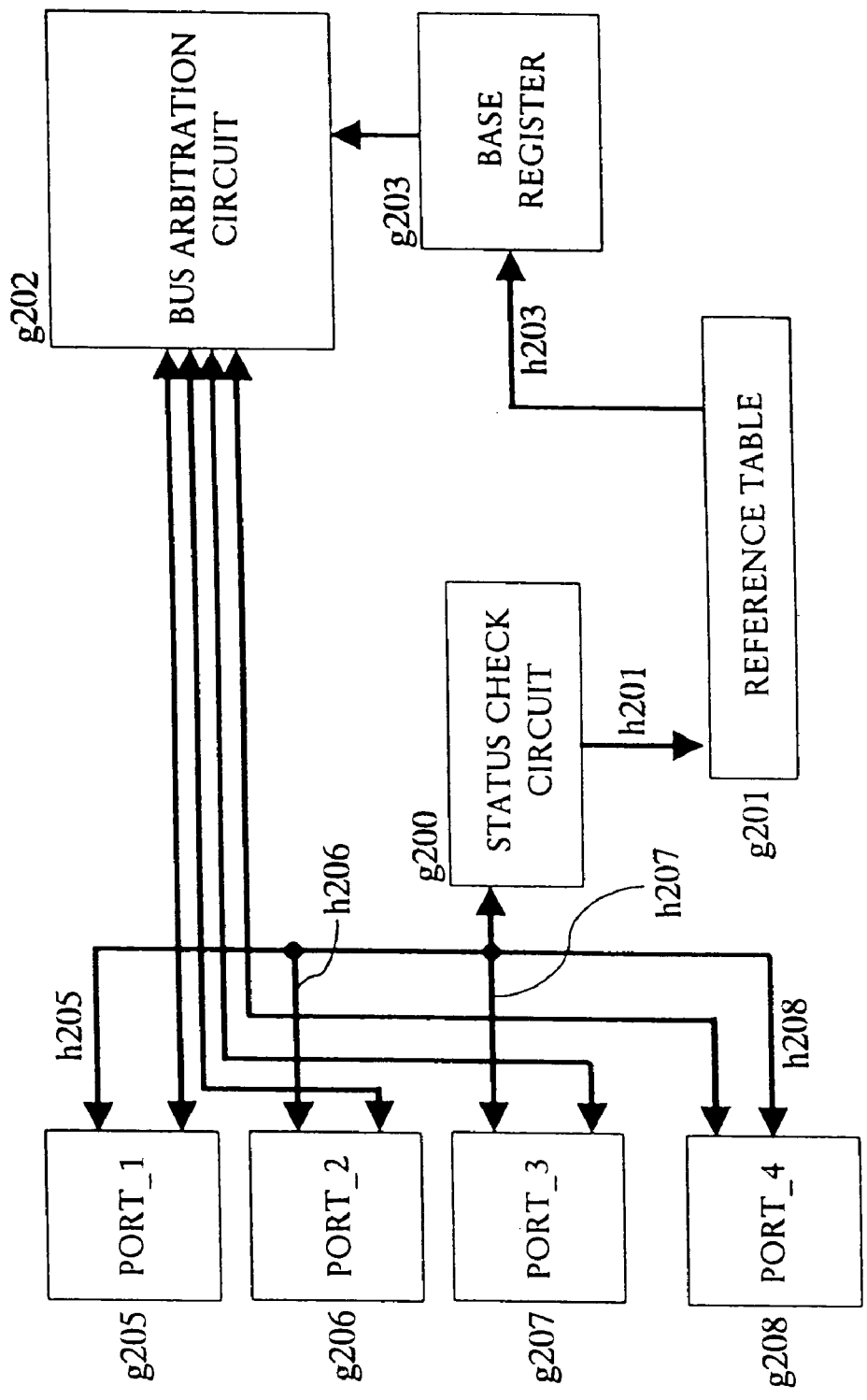
FIG. 10 is a block diagram showing the transmitter/receiver apparatus of a seventh embodiment of the invention.

Next, the transmitter/receiver apparatus of a seventh embodiment of the invention will be described in detail with reference to FIGS. 10 and 11. FIG. 10 is a block diagram showing the transmitter/receiver apparatus of the seventh embodiment of the invention. The transmitter/receiver apparatus of this embodiment complies with IEEE Std. 1394a-2000, and is composed of, as shown in the figure, a status check circuit g200, a reference table g201, a bus arbitration circuit g202, a base register g203, and four ports g205, g206, g207, and g208.

The status check circuit g200 checks whether the individual ports g205 to g208 are active or not on the basis of the status signals obtained by way of signal lines h205, h206, h207, and h208, and outputs the result of the checks (the combination of active ports) to the reference table g201 by way of a signal line h201.

The reference table g201 holds, among the jitter values between the individual ports g205 to g208, the maximum values corresponding to different combinations of active ports. A value read out from this reference table g201 according to the output signal (the combination of active ports) of the status check circuit g200 is assigned, by way of a signal line h203, to the jitter region (see FIG. 33) of the base register g203.

The bus arbitration circuit g202 arbitrates conflicts for the access to an IEEE serial bus. Moreover, to the bus arbitration circuit g202 is connected the base register g203, in which are stored the conditions under which the transmitter/receiver apparatus should operate. Thus, the transmitter/receiver apparatus operates under the conditions stored in the base register g203. The ports g205 to g208 each exchange signals with an external node.

FIG. 11 is a data map showing the contents stored in the reference table g201. In this data map, the port active value [port_active] is a parameter that represents the combination of active ports, with its first (highest) to fourth (lowest) bits representing the status of the ports g205 to g208, respectively. Here, in each bit position, the value "1" indicates an active port, and the value "0" indicates a nonactive port. For example, a port active value "1101" indicates that the ports g205, g206, and g208 are active and the port g207 is nonactive.

Moreover, in this data map are stored, among the jitter values between the individual ports g205 to g208, the maximum values corresponding to different combinations of active ports, so as to correspond one-to-one to the port active values [port_active] mentioned above (what is dealt with here is not the jitter values themselves but values calculated from the actual jitter values according to a predetermined calculation formula, and larger values represent larger jitters; this applies throughout the following descriptions). Thus, the jitter values stored in this data map do not include any jitter value involving a nonactive port. When no jitter value is available for a given combination of active ports, the value "0" is assigned as the maximum jitter value corresponding to that combination for convenience' sake.

In the transmitter/receiver apparatus configured as described above, consider, for example, a case where the ports g205, g206, and g208 are active and the port g207 is nonactive. In this case, by the conventional method, the jitter of the node is set equal to and kept constant at the maximum jitter value among all the combinations of the ports including the nonactive port g207, namely "9" (i.e., the value that is stored as corresponding to the port active value "1111" in the reference table g201 and that is the jitter value between the ports g206 and g207). By contrast, in the transmitter/receiver apparatus of this embodiment, the maximum value among the combinations of the ports excluding the nonactive port g207, namely "5" (i.e., the value that is stored as corresponding to the port active value "1101" in the reference table g201 and that is the jitter value between the ports g206 and g208) is selected as the jitter value of the node, and is assigned to the jitter region of the base register g203.

With this configuration, it is possible to avoid setting the jitter value of the transmitter/receiver apparatus unnecessarily large. This helps optimize the gap count [Gap_count] and hence the gaps themselves and thereby conduct communication efficiently.

Eighth Embodiment

Figure 12:
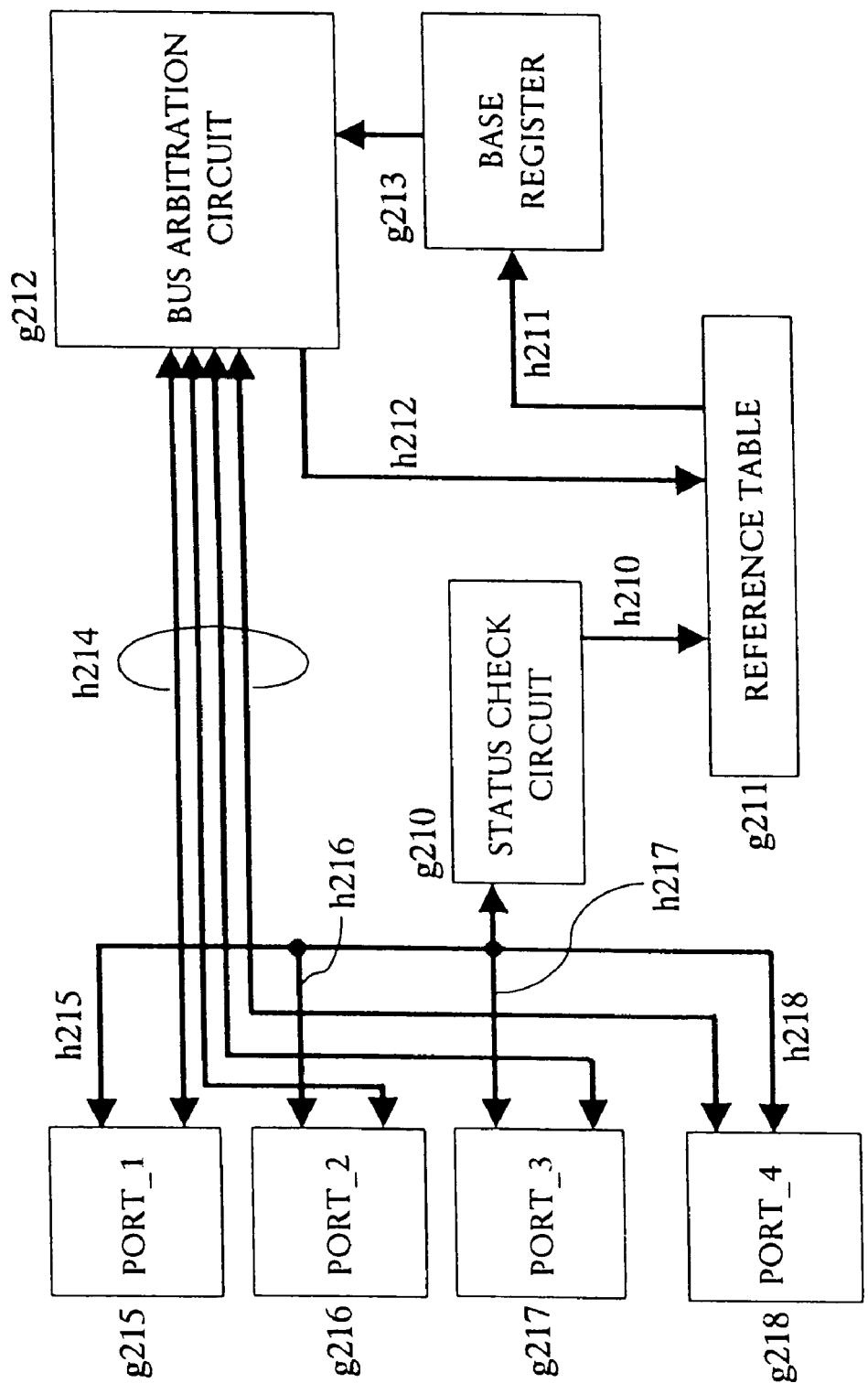
FIG. 12 is a block diagram showing the transmitter/receiver apparatus of an eighth embodiment of the invention.

Next, the transmitter/receiver apparatus of an eighth embodiment of the invention will be described in detail with reference to FIGS. 12 and 13. FIG. 12 is a block diagram showing the transmitter/receiver apparatus of the eighth embodiment of the invention. The transmitter/receiver apparatus of this embodiment complies with IEEE Std. 1394a-2000, and is composed of, as shown in the figure, a status check circuit g210, a reference table g211, a bus arbitration circuit g212, a base register g213, and four ports g215, g216, g217, and g218.

The status check circuit g210 checks whether the individual ports g215 to g218 are active or not on the basis of the status signals obtained by way of signal lines h215, h216, h217, and h218, and outputs the result of the checks (the combination of active ports) to the reference table g211 by way of a signal line h210.

The bus arbitration circuit g212 arbitrates conflicts for the access to an IEEE serial bus, and exchanges signals with the individual ports g215 to g218 by way of a signal line h214. Here, the bus arbitration circuit g212 checks from which port it has received a signal, and outputs the result of the check (information on the input port) to the reference table g211 by way of a signal line h212. Moreover, to the bus arbitration circuit g212 is connected the base register g213, in which are stored the conditions under which the transmitter/receiver apparatus should operate. Thus, the transmitter/receiver apparatus operates under the conditions stored in the base register g213. The ports g215 to g218 each exchange signals with an external node.

The reference table g211 holds, for each of the ports g215 to g218, among the jitter values between that port and the other ports, the maximum values corresponding to different combinations of active ports. A value read out from this reference table g211 according to the output signal (the combination of active ports) of the status check circuit g210 and the information on the input port obtained from the bus arbitration circuit g212 is assigned, by way of a signal line h211, to the jitter region (see FIG. 33) of the base register g213.

FIG. 13 is a data map showing the contents stored in the reference table g211. It is to be noted that this figure shows, of all the data maps stored one for each of the ports g215 to g218, only the one that is referred to when a control signal is input via the port g215. In this figure, the port active value [port_active] is a parameter that represents the combination of active ports, with its first (highest) to fourth (lowest) bits representing the status of the ports g215 to g218, respectively. Here, in each bit position, the value "1" indicates an active port, and the value "0" indicates a nonactive port. For example, a port active value "1101" indicates that the ports g215, g216, and g218 are active and the port g217 is nonactive.

Moreover, in this data map are stored, among the jitter values between the signal input port g215 and the other ports g216 to g218, the maximum values corresponding to different combinations of active ports, so as to correspond one-to-one to the port active values [port_active] mentioned above. Thus, the jitter values stored in this data map do not include any jitter value between the signal input port g215 and a nonactive port, or between active ports other than the signal input port g215. This permits more efficient setting of the jitter value than in the seventh embodiment.

In the transmitter/receiver apparatus configured as described above, consider, for example, a case where the ports other than the port g217 are active and a signal is input to the port g215. In this case, by the conventional method, the jitter value of the node is set equal to and kept constant at the maximum jitter value among all the combinations of the ports including the nonactive port g217. By contrast, in the transmitter/receiver apparatus of this embodiment, the maximum jitter value between the signal input port g215 and the other active ports g216 and 218, namely "3" (i.e., the value that is stored as corresponding to the port active value "1101" in the reference table g211 and that is the jitter value between the ports g215 and g216), is selected as the jitter value of the node, and is assigned to the jitter region of the base register g213.

With this configuration, it is possible to avoid setting the jitter value of the transmitter/receiver apparatus unnecessarily large. This helps optimize the gap count [Gap_count] and hence the gaps themselves and thereby conduct communication efficiently.

Ninth Embodiment

Figure 14:
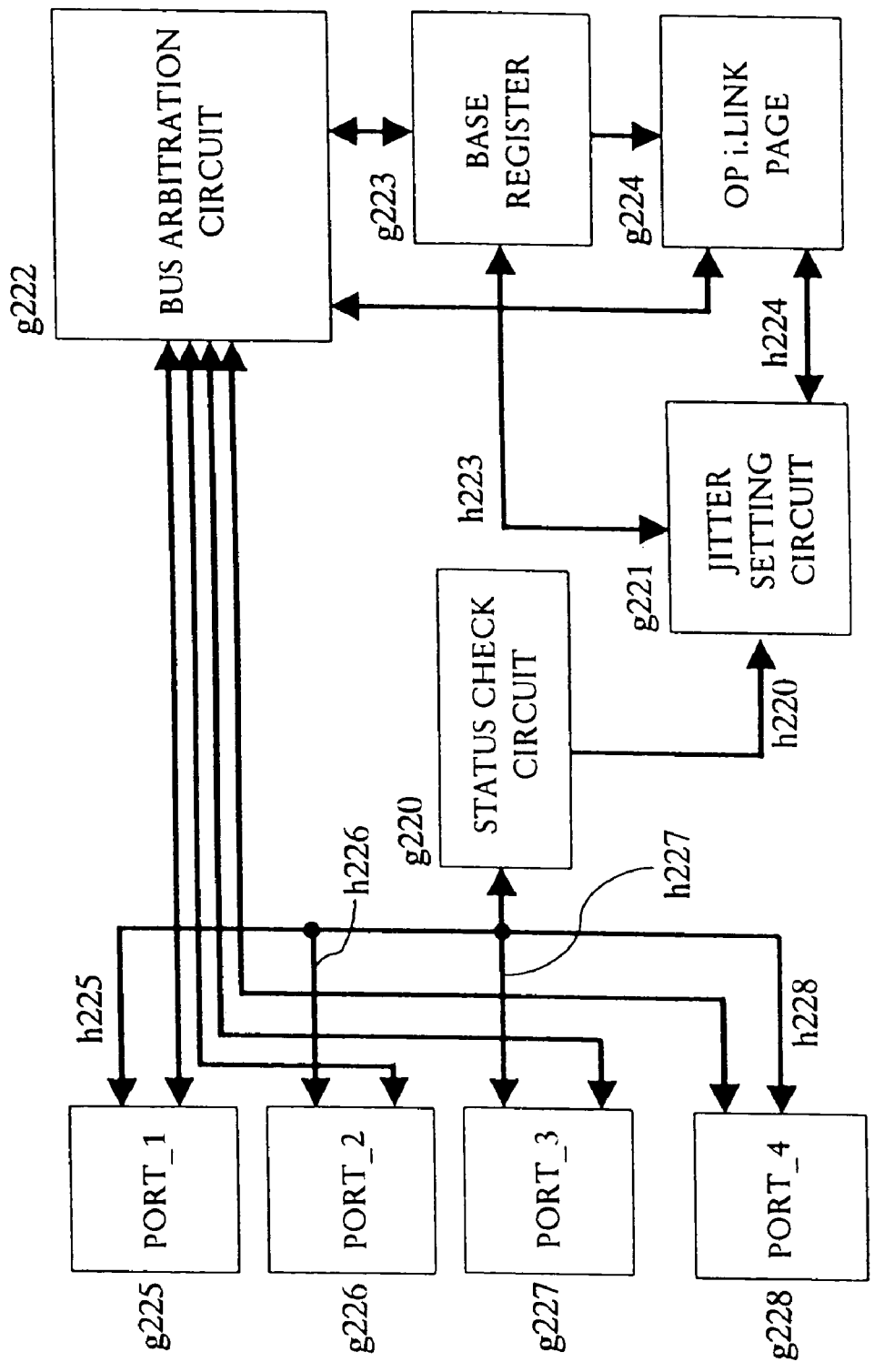
FIG. 14 is a block diagram showing the transmitter/receiver apparatus of a ninth embodiment of the invention.

Next, the transmitter/receiver apparatus of a ninth embodiment of the invention will be described in detail with reference to FIG. 14. FIG. 14 is a block diagram showing the transmitter/receiver apparatus of the ninth embodiment of the invention. The transmitter/receiver apparatus of this embodiment complies with the OP i.LINK standard, and is composed of, as shown in the figure, a status check circuit g220, a jitter setting circuit g221, a bus arbitration circuit g222, a base register g223, an OP i.LINK page g224, and four ports g225, g226, g227, and g228.

The status check circuit g220 checks whether the individual ports g225 to g228 are active or not on the basis of the status signals obtained by way of signal lines h225, h226, h227, and h228, and outputs the result of the checks (the combination of active ports) to the jitter setting circuit g221 by way of a signal line h220.

The jitter setting circuit g221 refers to the output signal (the combination of active ports) of the status check circuit g220 and the OP i.LINK page g224, and, if only DS ports are found active, the jitter setting circuit g221 reads out the value stored in the jitter DS-DS region (see FIG. 35) of the OP i.LINK page g224 and assigns it to the jitter region (see FIG. 33) of the base register g223 by way of signal lines h224 and h223.

The bus arbitration circuit g222 arbitrates conflicts for the access to a bus. Moreover, to the bus arbitration circuit g222 are connected the base register g223 and the OP i.LINK page g224, in both of which are stored the conditions under which the transmitter/receiver apparatus should operate. Thus, the transmitter/receiver apparatus operates under the conditions stored in the two registers g223 and g224. The ports g225 to g228 each exchange signals with an external node.

In the transmitter/receiver apparatus configured as described above, consider a case where only DS ports are active. In this case, by the conventional method, if the bus is managed by a bus manager that does not comply with the OP i.LINK standard, the jitter of the node is set equal not to the DS-port-to-DS-port jitter but to the optical-port-to-optical-port jitter, which is larger than the former. By contrast, in the transmitter/receiver apparatus of this embodiment, according to the output signal of the status check circuit g220 and the OP i.LINK page g224, it is recognized that only DS ports are active, and the value stored in the jitter DS-DS region of the OP i.LINK page g224 is assigned to the jitter region of the base register g223.

With this configuration, even if the bus manager does not comply with the OP i.LINK standard, when only DS ports of a node are active, the jitter value of the node can be set equal to the DS-port-to-DS-port jitter value. This helps optimize the gap count [Gap_count] and hence the gaps themselves and thereby conduct communication efficiently.

Tenth Embodiment

Figure 15:
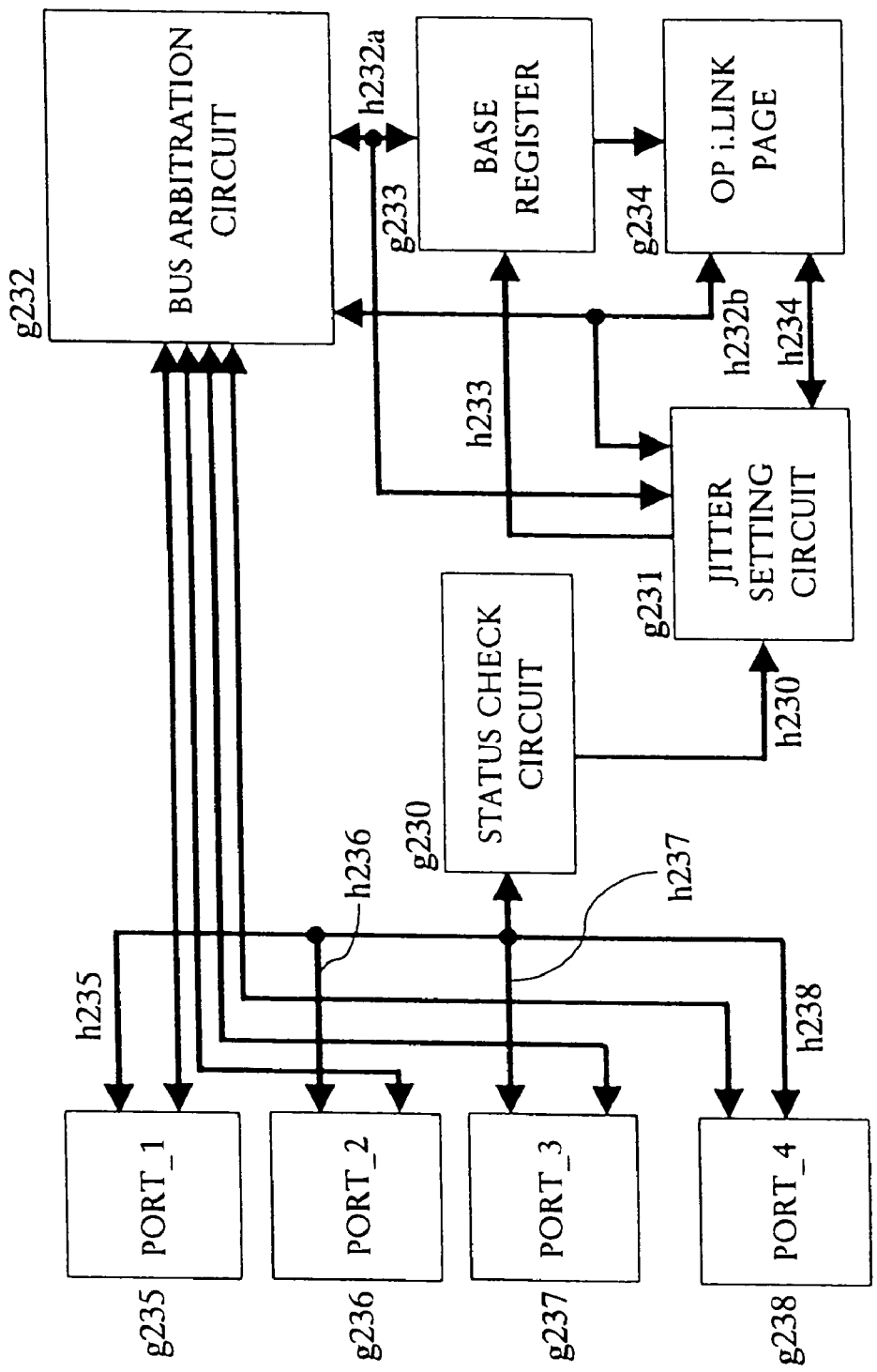
FIG. 15 is a block diagram showing the transmitter/receiver apparatus of a tenth embodiment of the invention.

Next, the transmitter/receiver apparatus of a tenth embodiment of the invention will be described in detail with reference to FIG. 15. FIG. 15 is a block diagram showing the transmitter/receiver apparatus of the tenth embodiment of the invention. The transmitter/receiver apparatus of this embodiment complies with the OP i.LINK standard, and is composed of, as shown in the figure, a status check circuit g230, a jitter setting circuit g231, a bus arbitration circuit g232, a base register g233, an OP i.LINK page g234, and four ports g235, g236, g237, and g238.

The status check circuit g230 checks whether the individual ports g235 to g238 are active or not on the basis of the status signals obtained by way of signal lines h235, h236, h237, and h238, and outputs the result of the checks (the combination of active ports) to the jitter setting circuit g231 by way of a signal line h230.

The jitter setting circuit g231 refers to the output signal (the combination of active ports) of the status check circuit g230 and the OP i.LINK page g234, and monitors signal lines h232a and h232b by way of which the bus arbitration circuit g232 is connected to the base register g233 and the OP i.LINK page g234, respectively, so that, when only DS ports are active, if not the OP i.LINK page g234 but only the base register g233 is accessed by a remote access packet from an external node (bus manager), the jitter setting circuit g231 reads out the value stored in the jitter DS-DS region (see FIG. 35) of the OP i.LINK page g234 and assigns it to the jitter region (see FIG. 33) of the base register g233 by way of signal lines H234 and H233.

The bus arbitration circuit g232 arbitrates conflicts for the access to a bus. Moreover, to the bus arbitration circuit g232 are connected the base register g233 and the OP i.LINK page g234, in both of which are stored the conditions under which the transmitter/receiver apparatus should operate. Thus, the transmitter/receiver apparatus operates under the conditions stored in the two registers g233 and g234. The ports g235 to g238 each exchange signals with an external node.

In the transmitter/receiver apparatus configured as described above, consider a case where only DS ports are active. In this case, by the conventional rmethod, if the bus is managed by a bus manager that does not comply with the OP i.LINK standard, the jitter of the node is set equal not to the DS-port-to-DS-port jitter but to the optical-port-to-optical-port jitter, which is larger than the former. By contrast, in the transmitter/receiver apparatus of this embodiment, as soon as, according to the output signal of the status check circuit g230 and the OP i.LINK page g234, it is recognized that only DS ports are active, and in addition, according to the result of the monitoring of the signal lines h232a and h232b, it is recognized that not the OP i.LINK page g234 but only the base register g233 is accessed from an external node (bus manager), the value stored in the jitter DS-DS region of the OP i.LINK page g234 is assigned to the jitter region of the base register g233.

With this configuration, even if the bus manager does not comply with the OP i.LINK standard, when only DS ports of a node are active, the jitter value of the node can be set equal to the DS-port-to-DS-port jitter value. This helps optimize the gap count [Gap_count] and hence the gaps themselves and thereby conduct communication efficiently.

Eleventh Embodiment

Figure 16:
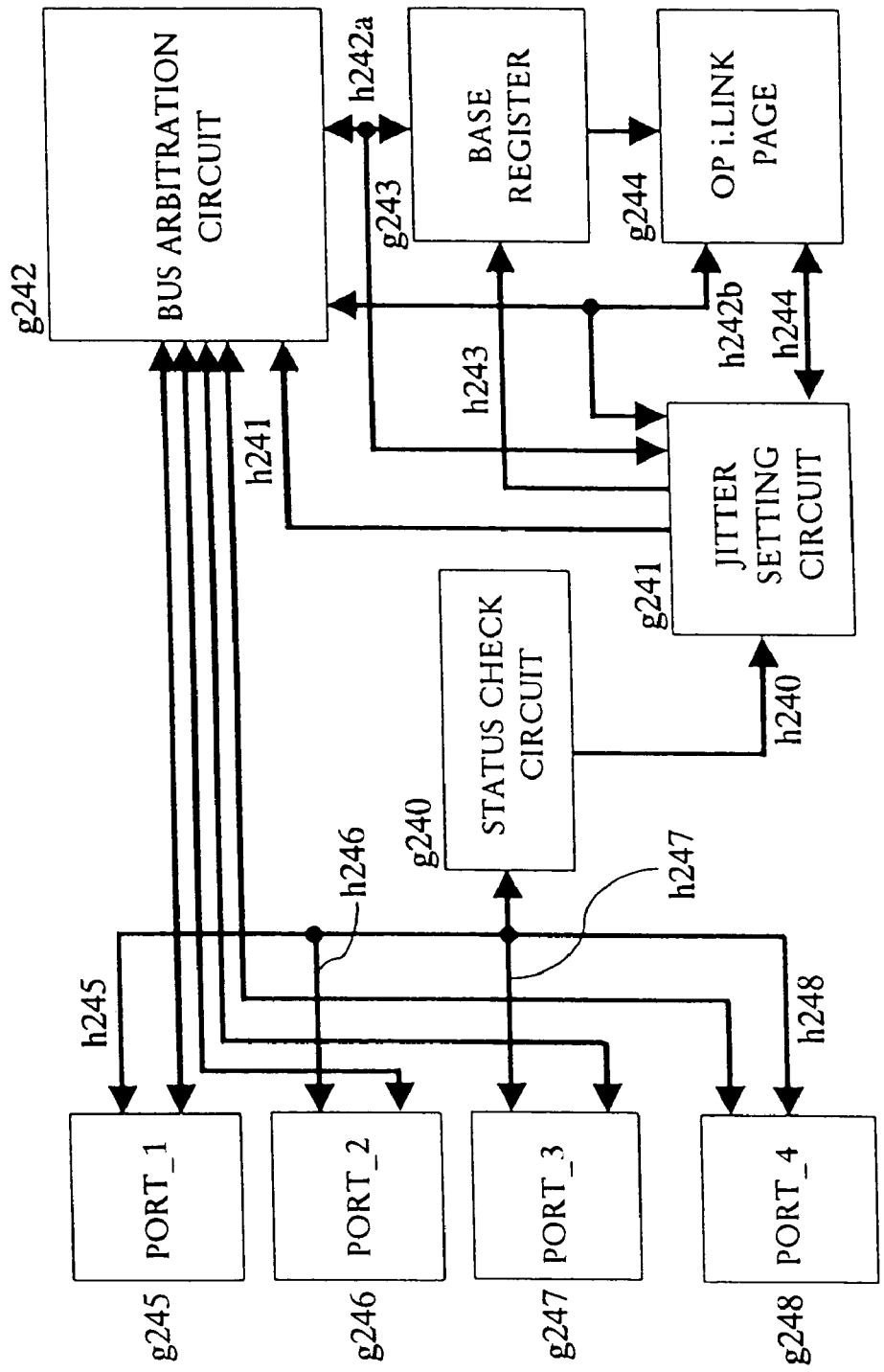
FIG. 16 is a block diagram showing the transmitter/receiver apparatus of an eleventh embodiment of the invention.

Next, the transmitter/receiver apparatus of an eleventh embodiment of the invention will be described in detail with reference to FIG. 16. FIG. 16 is a block diagram showing the transmitter/receiver apparatus of the eleventh embodiment of the invention. The transmitter/receiver apparatus of this embodiment complies with the OP i.LINK standard, and is composed of, as shown in the figure, a status check circuit g240, a jitter setting circuit g241, a bus arbitration circuit g242, a base register g243, an OP i.LINK page g244, and four ports g245, g246, g247, and g248.

The status check circuit g240 checks whether the individual ports g245 to g248 are active or not on the basis of the status signals obtained by way of signal lines h245, h246, h247, and h248, and outputs the result of the checks (the combination of active ports) to the jitter setting circuit g241 by way of a signal line h240.

The jitter setting circuit g241 refers to the output signal (the combination of active ports) of the status check circuit g240 and the OP i.LINK page g244, and monitors signal lines h242a and h242b by way of which the bus arbitration circuit g242 is connected to the base register g243 and the OP i.LINK page g244, respectively, so that, when only DS ports are active, if not the OP i.LINK page g244 but only the base register g243 is accessed by a remote access packet from an external node (bus manager), the jitter setting circuit g241 reads out the value stored in the jitter DS-DS region (see FIG. 35) of the OP i.LINK page g244 and outputs it to the bus arbitration circuit g242 by way of a signal line h241 so as to assign it to a predetermined data region of a remote reply packet that is returned to the external node.

The bus arbitration circuit g242 arbitrates conflicts for the access to a bus. Moreover, to the bus arbitration circuit g242 are connected the base register g243 and the OP i.LINK page g244, in both of which are stored the conditions under which the transmitter/receiver apparatus should operate. Thus, the transmitter/receiver apparatus operates under the conditions stored in the two registers g243 and g244. The ports g245 to g248 each exchange signals with an external node.

In the transmitter/receiver apparatus configured as described above, consider a case where only DS ports are active. In this case, by the conventional method, if the bus is managed by a bus manager that does not comply with the OP i.LINK standard, the jitter of the node is set equal not to the DS-port-to-DS-port jitter but to the optical-port-to-optical-port jitter, which is larger than the former. By contrast, in the transmitter/receiver apparatus of this embodiment, as soon as, according to the output signal of the status check circuit g240 and the OP i.LINK page g244, it is recognized that only DS ports are active, and in addition, according to the result of the monitoring of the signal lines h242a and h242b, it is recognized that not the OP i.LINK page g244 but only the base register g243 is accessed from an external node (bus manager), the value stored in the jitter DS-DS region of the OP i.LINK page g244 is assigned to a predetermined data region of a remote reply packet.

With this configuration, even if the bus manager does not comply with the OP i.LINK standard, when only DS ports of a node are active, the jitter value of the node can be set equal to the DS-port-to-DS-port jitter value. This helps optimize the gap count [Gap_count] and hence the gaps themselves and thereby conduct communication efficiently.

Twelfth Embodiment

Figure 17:
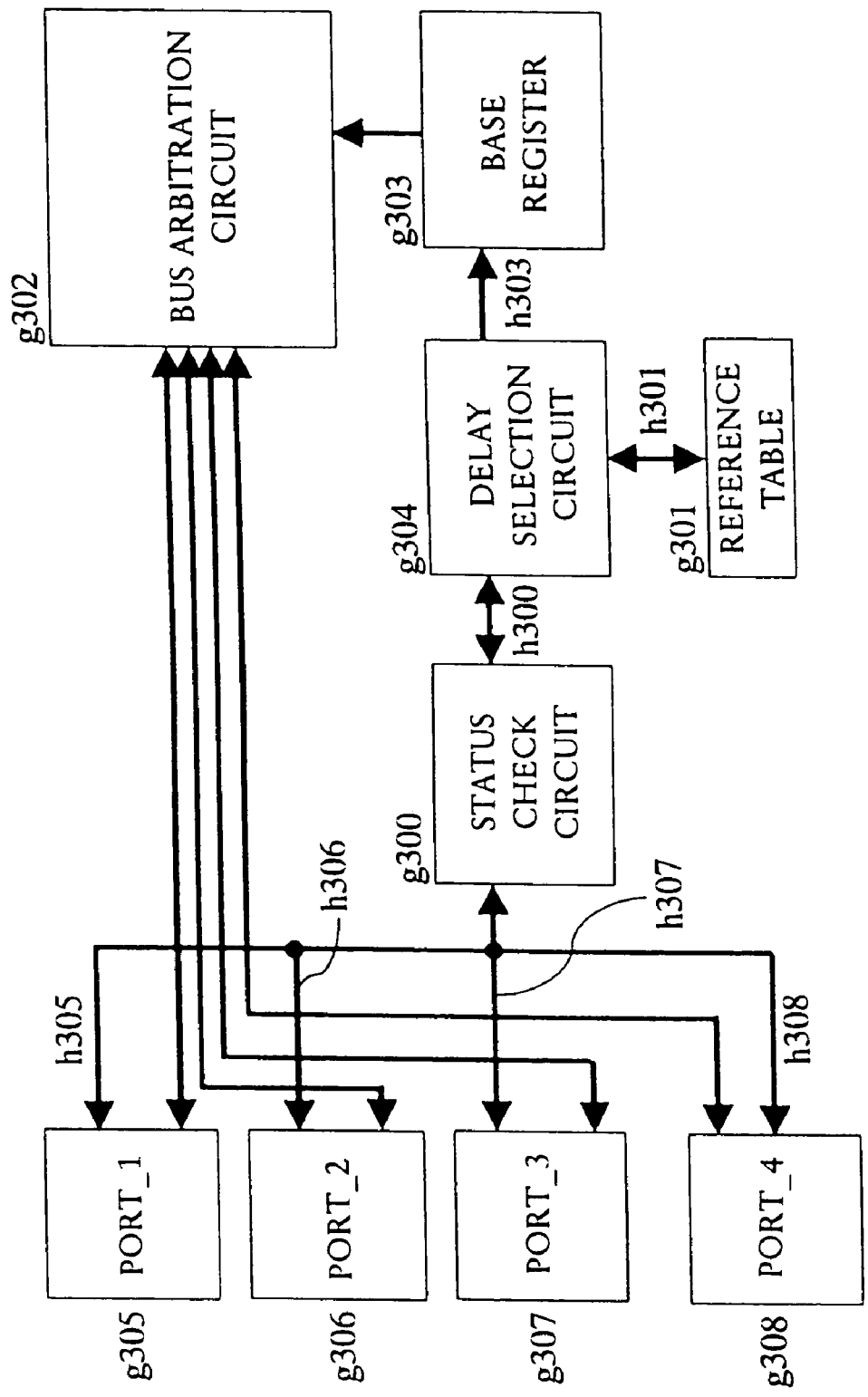
FIG. 17 is a block diagram showing the transmitter/receiver apparatus of a twelfth embodiment of the invention.

Next, the transmitter/receiver apparatus of a twelfth embodiment of the invention will be described in detail with reference to FIGS. 17 and 18. FIG. 17 is a block diagram showing the transmitter/receiver apparatus of the twelfth embodiment of the invention. The transmitter/receiver apparatus of this embodiment complies with IEEE Std. 1394a-2000, and is composed of, as shown in the figure, a status check circuit g300, a reference table g301, a bus arbitration circuit g302, a base register g303, a delay selection circuit g304, and four ports g305, g306, g307, and g308.

The status check circuit g300 checks whether the individual ports g305 to g308 are active or not on the basis of the status signals obtained by way of signal lines h305, h306, h307, and h308, and outputs the result of the checks (the combination of active ports) to the delay selection circuit g304 by way of a signal line h300.

The reference table g301 holds all the transmission delay values between the individual ports g305 to g308. FIG. 18 is a data map showing the contents stored in the reference table g301. As shown in this figure, in the reference table g301 are stored, in the form of a matrix, all the transmission delay values between the individual ports g305 to g308 (what is dealt with here is not the transmission delay values themselves but values calculated from the actual transmission delay values according to a predetermined calculation formula, and larger values represent larger transmission delays; this applies throughout the following descriptions).

The bus arbitration circuit g302 arbitrates conflicts for the access to an IEEE serial bus. Moreover, to the bus arbitration circuit g302 is connected the base register g303, in which are stored the conditions under which the transmitter/receiver apparatus should operate. Thus, the transmitter/receiver apparatus operates under the conditions stored in the base register g303. The ports g305 to g308 each exchange signals with an external node.

According to the output signal (the combination of active ports) of the status check circuit g300, the delay selection circuit g304 selects, from among all the transmission delay values stored in the reference table g301, the maximum transmission delay value between active ports, and assigns it, by way of a signal line h303, to the delay region (see FIG. 33) of the base register g303.

In the transmitter/receiver apparatus configured as described above, consider, for example, a case where the ports g305, g306, and g308 are active and the port g307 is nonactive. In this case, by the conventional method, the transmission delay of the node is set equal to and kept constant at the maximum transmission delay value among all the combinations of the ports including the nonactive port g307, namely "9" (i.e., the value stored as the transmission delay value between the ports g306 and g307 in the reference table g301). By contrast, in the transmitter/receiver apparatus of this embodiment, the maximum value among the combinations of the ports excluding the nonactive port g307, namely "5" (i.e., the value stored as the transmission delay value between the ports g306 and g308 in the reference table g301) is selected as the transmission delay value of the node, and is assigned to the delay region of the base register g303.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Thirteenth Embodiment

Next, the transmitter/receiver apparatus of a thirteenth embodiment of the invention will be described. The transmitter/receiver apparatus of this embodiment has the same block configuration (see FIG. 17) as that of the twelfth embodiment described above, but differs therefrom in that in the reference table g301 are stored not only the transmission delay values between the individual ports g305 to g308 but also the transmission delay values required for the individual ports g305 to g308 to handle signal input and output singly (i.e., the transmission delay value after a control signal is input to a given port until the port returns a control signal in response to the control signal).

For example, if it is assumed that the transmission delay values between the individual ports g305 to g308 are the same as in the twelfth embodiment (see FIG. 18), and that the transmission delay values required for the individual ports g305 to g308 to handle signal input/output singly are "1," "7," "10," and "4," respectively, then the data map shown in FIG. 19 is stored in the reference table g301.

With this configuration, even when signal input and output are handled by a single port, it is possible to avoid setting the transmission delay value of the transmitter/receiver apparatus unduly small. This helps secure a sufficient gap count [Gap_count] and hence sufficient gaps and thereby conduct communication surely.

Figure 20:
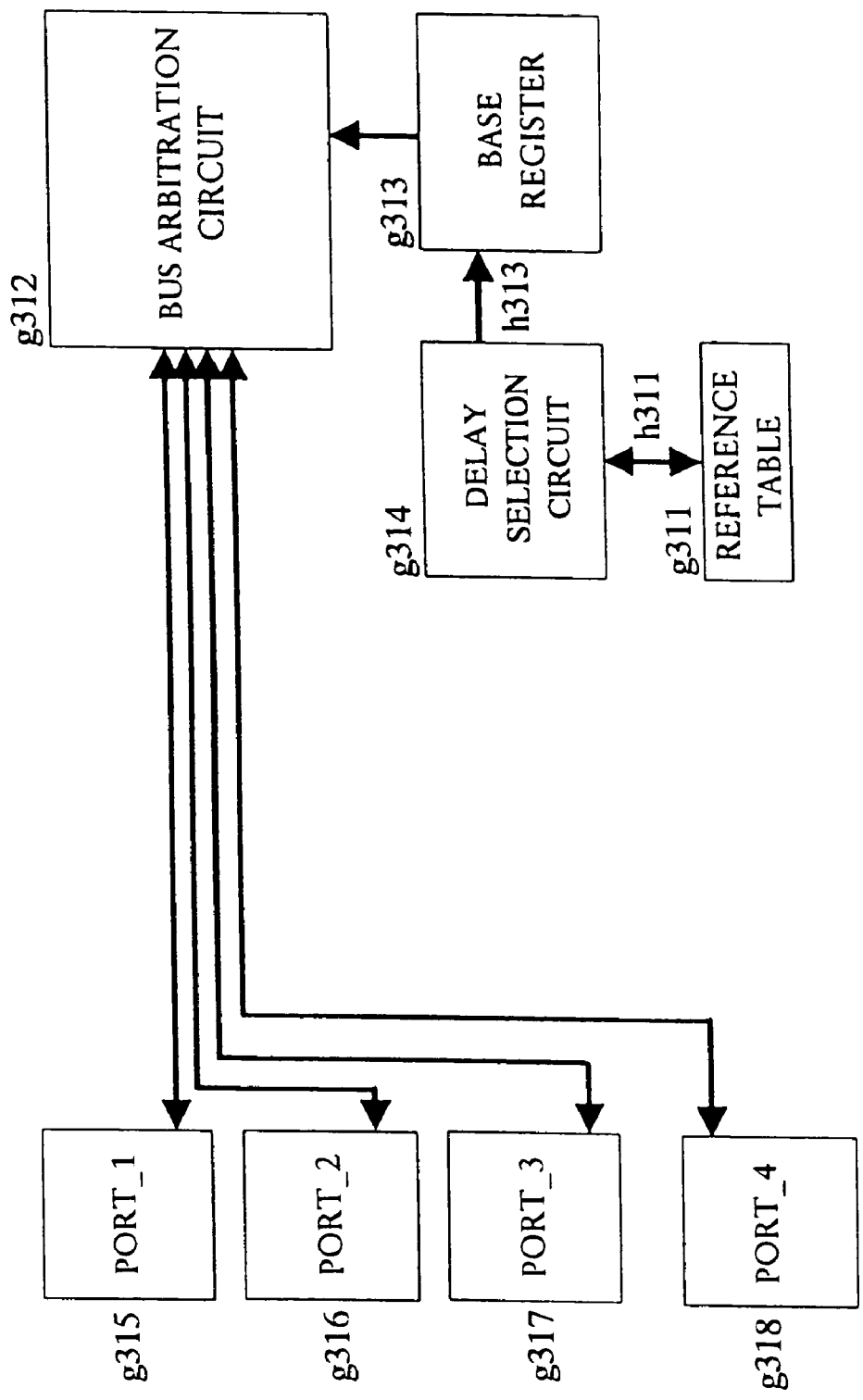
FIG. 20 is a block diagram showing another example of the configuration of the transmitter/receiver apparatus of the thirteenth embodiment.

In a case where whether the ports are active or not is not checked, it is possible to omit the status check circuit from the configuration shown in FIG. 17 (see FIG. 20). In this case, in the reference table g311 is stored only the maximum value among the transmission delay values between the individual ports g315 to g318 and the transmission delay values required for the individual ports g315 to g318 to handle signal input and output singly.

Fourteenth Embodiment

Figure 21:
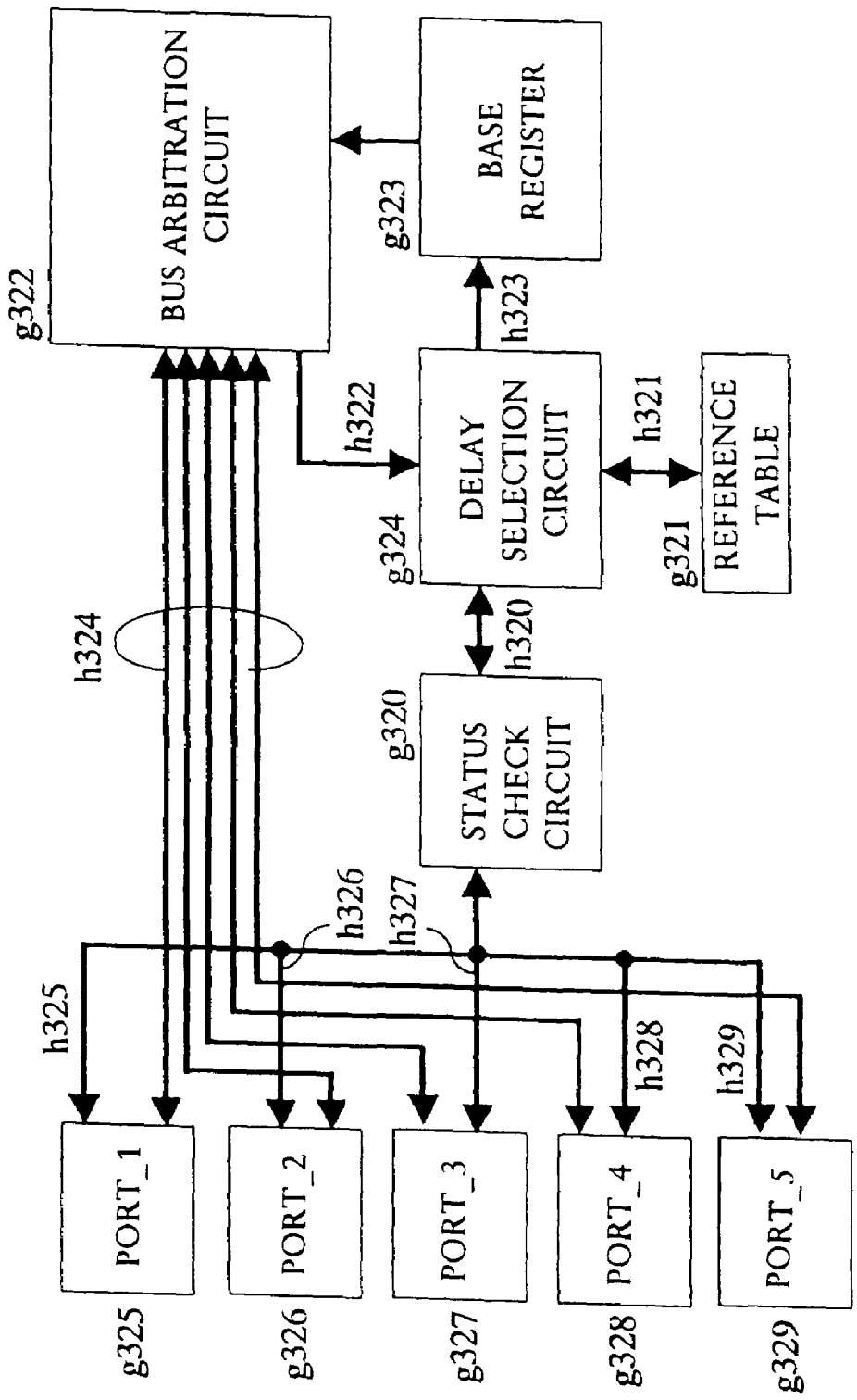
FIG. 21 is a block diagram showing the transmitter/receiver apparatus of a fourteenth embodiment of the invention.

Next, the transmitter/receiver apparatus of a fourteenth embodiment of the invention will be described in detail with reference to FIGS. 21 and 22. FIG. 21 is a block diagram showing the transmitter/receiver apparatus of the fourteenth embodiment of the invention. The transmitter/receiver apparatus of this embodiment complies with IEEE Std. 1394a-2000, and is composed of, as shown in the figure, a status check circuit g320, a reference table g321, a bus arbitration circuit g322, a base register g323, a delay selection circuit g324, and five ports g325, g326, g327, g328, and g329.

The status check circuit g320 checks whether the individual ports g325 to g329 are active or not on the basis of the status signals obtained by way of signal lines h325, h326, h327, h328, and h329, and outputs the result of the checks (the combination of active ports) to the delay selection circuit g324 by way of a signal line h320.

The reference table g321 holds all the transmission delay values between the individual ports g325 to g329 and the transmission delay values required for the individual ports g325 to g329 to handle signal input and output singly. FIG. 22 is a data map showing the contents stored in the reference table g321. As shown in this figure, in the reference table g321 are stored, in the form of a matrix, all the transmission delay values between the individual ports g325 to g329 and the transmission delay values required for the individual ports g325 to g329 to handle signal input and output singly.

The bus arbitration circuit g322 arbitrates conflicts for the access to an IEEE serial bus, and exchanges signals with the individual ports g325 to g329 by way of a signal line h324. Here, the bus arbitration circuit g322 checks from which port it has received a signal, and outputs the result of the check (information on the input port) to the delay selection circuit g324 by way of a signal line h322. Moreover, to the bus arbitration circuit g322 is connected the base register g323, in which are stored the conditions under which the transmitter/receiver apparatus should operate. Thus, the transmitter/receiver apparatus operates under the conditions stored in the base register g323. The ports g325 to g329 each exchange signals with an external node.

According to the output signal (the combination of active ports) of the status check circuit g320 and the information on the input port obtained from the bus arbitration circuit g322, the delay selection circuit g324 selects, from among all the transmission delay values stored in the reference table g321, the largest of the transmission delay values between the active ports excluding the signal input port and the transmission delay value required by the signal input port to handle signal input and output singly, and assigns it, by way of a signal line h323, to the delay region (see FIG. 33) of the base register g323.

For example, when the ports other than the port g329 are active, and a signal is input to the port g325, then the values enclosed with broken-line circles in FIG. 22 become targets of the delay selection circuit g324. Thus, the transmission delay values that become targets of the delay selection circuit g324 do not include any transmission delay value between the signal input port and a nonactive port, between the signal input port and another active port, or required by another active port to handle signal input and output singly. This permits more efficient setting of the transmission delay value than in the twelfth embodiment.

In the transmitter/receiver apparatus configured as described above, consider, for example, a case where the ports other than the port g329 are active and a signal is input to the port g325. In this case, by the conventional method, the transmission delay value of the node is set equal to and kept constant at the maximum transmission delay value among all the combinations of the ports including the nonactive port g329, namely "11" (i.e., the value stored as the transmission delay value between the ports g325 and g328 in the reference table g321). By contrast, in the transmitter/receiver apparatus of this embodiment, the largest of the transmission delay values between the active ports g326 to g328 excluding the signal input port g325 and the transmission delay value required by the signal input port g325 to handle signal input and output singly, namely "9" (i.e., the value stored as the transmission delay value between the ports g326 and g327 in the reference table g321), is selected as the transmission delay value of the node, and is assigned to the delay region of the base register g323.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Fifteenth Embodiment

Figure 23:
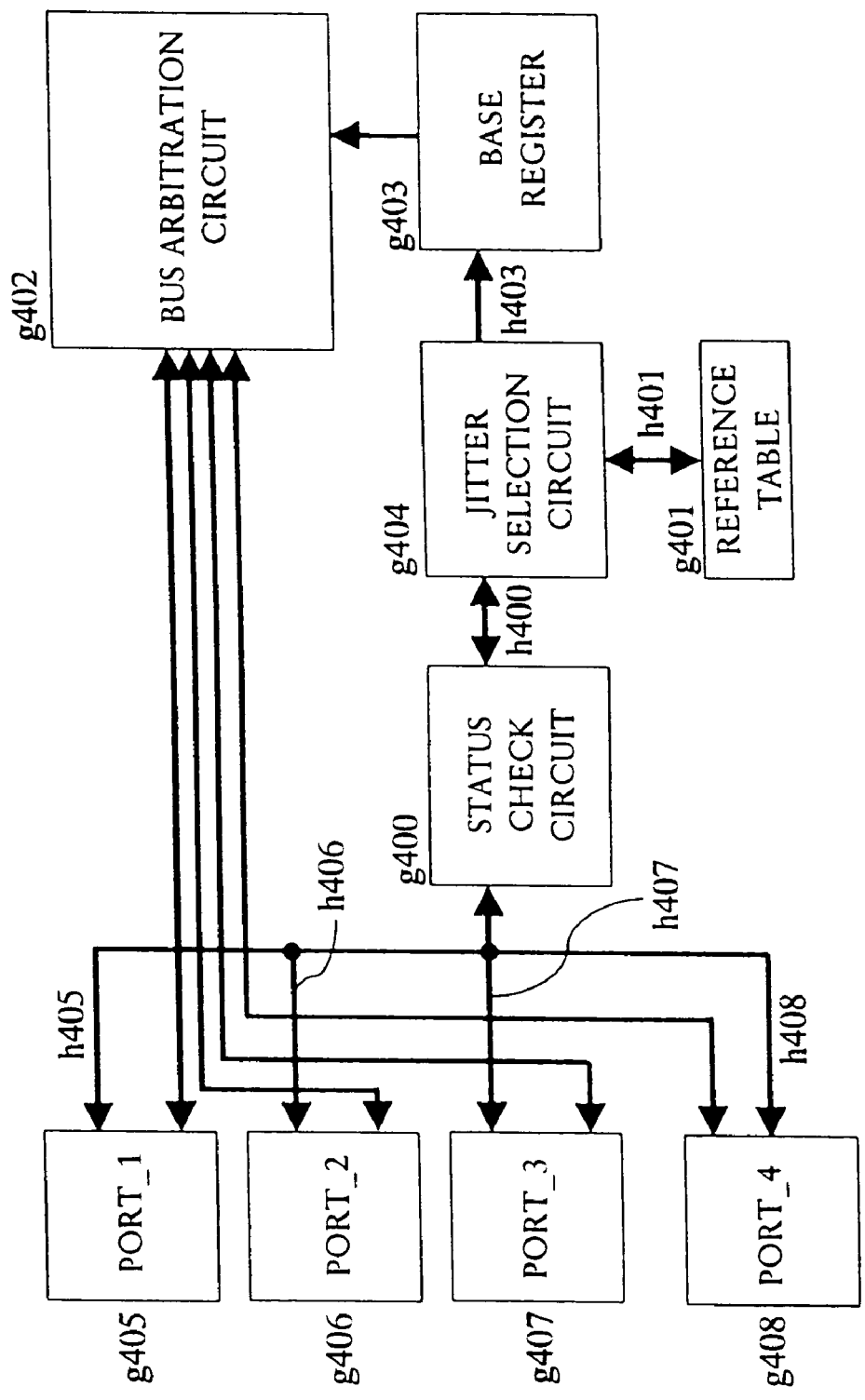
FIG. 23 is a block diagram showing the transmitter/receiver apparatus of a fifteenth embodiment of the invention.

Next, the transmitter/receiver apparatus of a fifteenth embodiment of the invention will be described in detail with reference to FIGS. 23 and 24. FIG. 23 is a block diagram showing the transmitter/receiver apparatus of the fifteenth embodiment of the invention. The transmitter/receiver apparatus of this embodiment complies with IEEE Std. 1394a-2000, and is composed of, as shown in the figure, a status check circuit g400, a reference table g401, a bus arbitration circuit g402, a base register g403, a jitter selection circuit g404, and four ports g405, g406, g407, and g408.

The status check circuit g400 checks whether the individual ports g405 to g408 are active or not on the basis of the status signals obtained by way of signal lines h405, h406, h407, and h408, and outputs the result of the checks (the combination of active ports) to the jitter selection circuit g404 by way of a signal line h400.

The reference table g401 holds all the jitter values between the individual ports g405 to g408. FIG. 24 is a data map showing the contents stored in the reference table g401. As shown in this figure, in the reference table g401 are stored, in the form of a matrix, all the jitter values between the individual ports g405 to g408 (what is dealt with here is not the jitter values themselves but values calculated from the actual jitter values according to a predetermined calculation formula, and larger values represent larger jitters; this applies throughout the following descriptions).

The bus arbitration circuit g402 arbitrates conflicts for the access to an IEEE serial bus. Moreover, to the bus arbitration circuit g402 is connected the base register g403, in which are stored the conditions under which the transmitter/receiver apparatus should operate. Thus, the transmitter/receiver apparatus operates under the conditions stored in the base register g403. The ports g405 to g408 each exchange signals with an external node.

According to the output signal (the combination of active ports) of the status check circuit g400, the jitter selection circuit g404 selects, from among all the jitter values stored in the reference table g401, the maximum jitter value between active ports, and assigns it, by way of a signal line h403, to the jitter region (see FIG. 33) of the base register g403.

In the transmitter/receiver apparatus configured as described above, consider, for example, a case where the ports g405, g406, and g408 are active and the port g407 is nonactive. In this case, by the conventional method, the jitter of the node is set equal to and kept constant at the maximum jitter value among all the combinations of the ports including the nonactive port g407, namely "9" (i.e., the value stored as the jitter value between the ports g406 and g407 in the reference table g401). By contrast, in the transmitter/receiver apparatus of this embodiment, the maximum value among the combinations of the ports excluding the nonactive port g407, namely "5" (i.e., the value stored as the jitter value between the ports g406 and g408 in the reference table g401) is selected as the jitter value of the node, and is assigned to the jitter region of the base register g403.

With this configuration, it is possible to avoid setting the jitter value of the transmitter/receiver apparatus unnecessarily large. This helps optimize the gap count [Gap_count] and hence the gaps themselves and thereby conduct communication efficiently.

Sixteenth Embodiment

Figure 25:
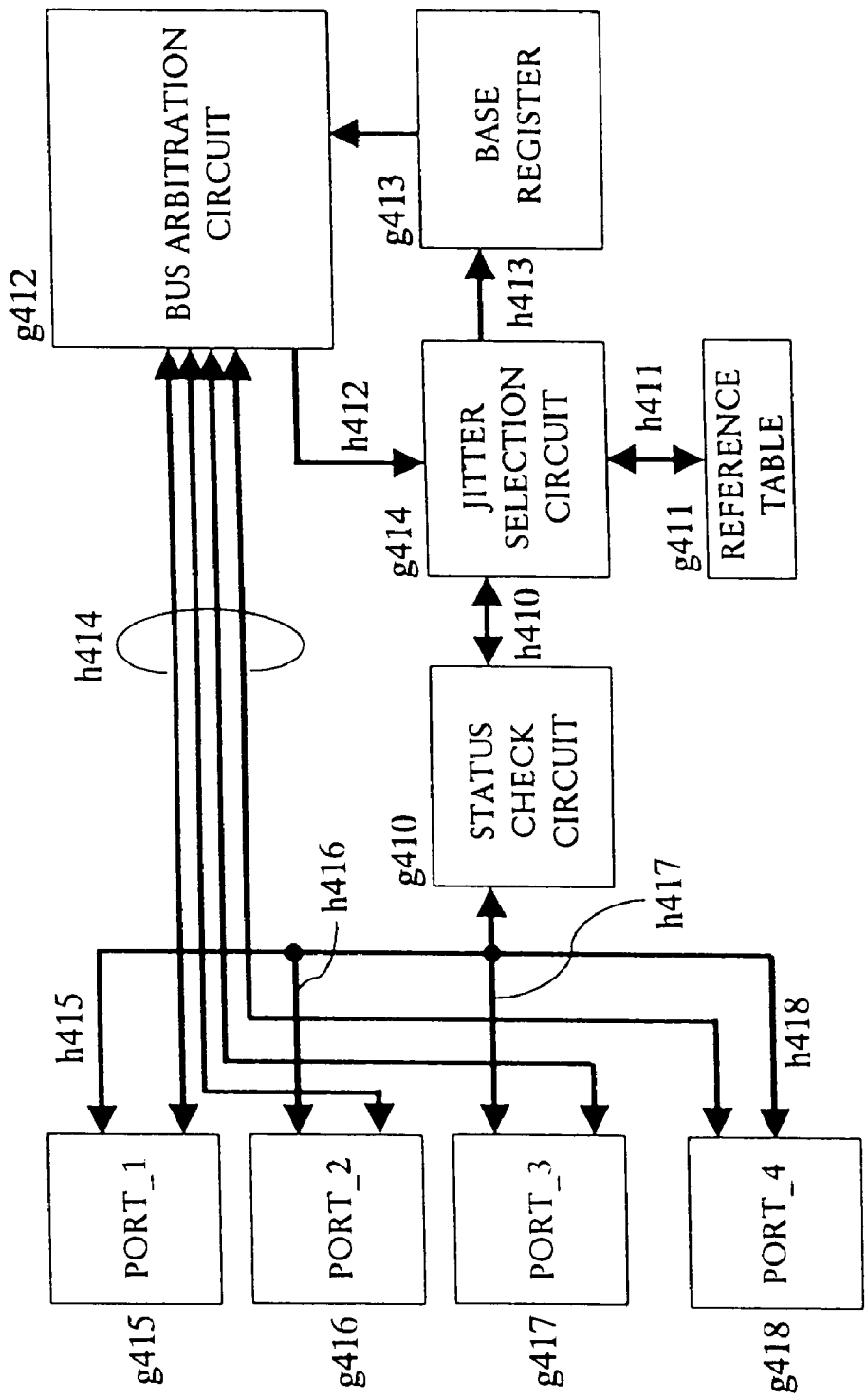
FIG. 25 is a block diagram showing the transmitter/receiver apparatus of a sixteenth embodiment of the invention.

Next, the transmitter/receiver apparatus of a sixteenth embodiment of the invention will be described in detail with reference to FIGS. 25 and 26. FIG. 25 is a block diagram showing the transmitter/receiver apparatus of the sixteenth embodiment of the invention. The transmitter/receiver apparatus of this embodiment complies with IEEE Std. 1394a-2000, and is composed of, as shown in the figure, a status check circuit g410, a reference table g411, a bus arbitration circuit g412, a base register g413, a jitter selection circuit g414, and four ports g415, g416, g417, and g418.

The status check circuit g410 checks whether the individual ports g415 to g418 are active or not on the basis of the status signals obtained by way of signal lines h415, h416, h417, and h418, and outputs the result of the checks (the combination of active ports) to the jitter selection circuit g414 by way of a signal line h410.

The reference table g411 holds all the jitter values between the individual ports g415 to g418. FIG. 26 is a data map showing the contents stored in the reference table g411. As shown in this figure, in the reference table g411 are stored, in the form of a matrix, all the jitter values between the individual ports g415 to g418.

The bus arbitration circuit g412 arbitrates conflicts for the access to an IEEE serial bus, and exchanges signals with the individual ports g415 to g418 by way of a signal line h414. Here, the bus arbitration circuit g412 checks from which port it has received a signal, and outputs the result of the check (information on the input port) to the jitter selection circuit g414 by way of a signal line h412. Moreover, to the bus arbitration circuit g412 is connected the base register g413, in which are stored the conditions under which the transmitter/receiver apparatus should operate. Thus, the transmitter/receiver apparatus operates under the conditions stored in the base register g413. The ports g415 to g418 each exchange signals with an external node.

According to the output signal (the combination of active ports) of the status check circuit g410 and the information on the input port obtained from the bus arbitration circuit g412, the jitter selection circuit g414 selects, from among all the jitter values stored in the reference table g411, the maximum jitter value between the signal input port and the other active ports, and assigns it, by way of a signal line h413, to the jitter region (see FIG. 33) of the base register g413.

For example, when the ports other than the port g417 are active, and a signal is input to the port g415, then the values enclosed with broken-line circles in FIG. 26 become targets of the jitter selection circuit g414. Thus, the jitter values that become targets of the jitter selection circuit g414 do not include any jitter value between the signal input port and a nonactive port, or between the other active ports than the signal input port. This permits more efficient setting of the jitter value than in the twelfth embodiment.

In the transmitter/receiver apparatus configured as described above, consider, for example, a case where the ports other than the port g417 are active and a signal is input to the port g415. In this case, by the conventional method, the jitter value of the node is set equal to and kept constant at the maximum jitter value among all the combinations of the ports including the nonactive port g417, namely "9" (i.e., the value stored as the jitter value between the ports g416 and g417 in the reference table g411). By contrast, in the transmitter/receiver apparatus of this embodiment, the maximum jitter value between the signal input port g415 and the other active ports g416 and g418, namely "3" (i.e., the value stored as the jitter value between the ports g415 and g416 in the reference table g411), is selected as the jitter value of the node, and is assigned to the jitter region of the base register g413.

With this configuration, it is possible to avoid setting the jitter value of the transmitter/receiver apparatus unnecessarily large. This helps optimize the gap count [Gap_count] and hence the gaps themselves and thereby conduct communication efficiently.

Seventeenth Embodiment

Figure 27:
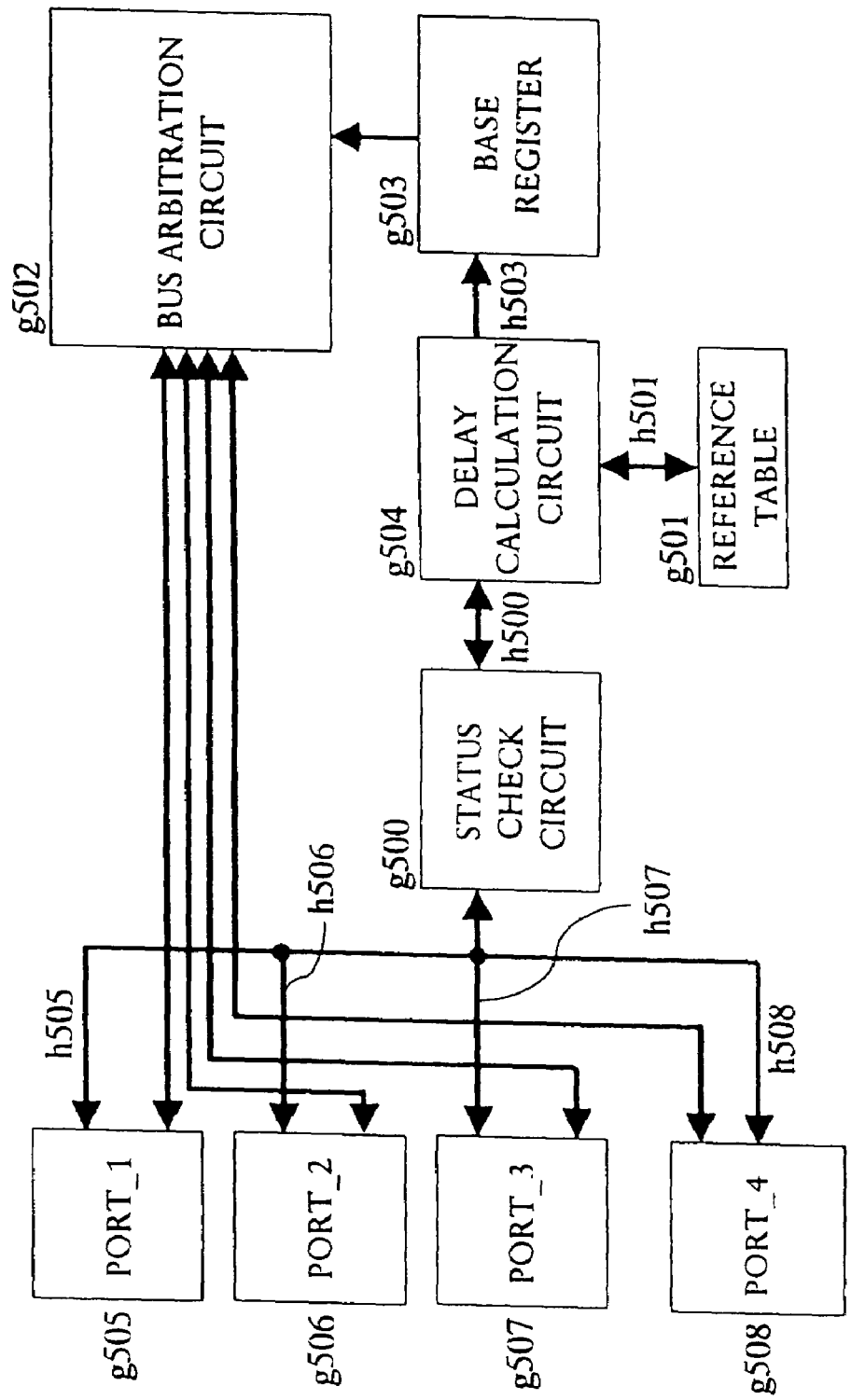
FIG. 27 is a block diagram showing the transmitter/receiver apparatus of a seventeenth embodiment of the invention.

Next, the transmitter/receiver apparatus of a seventeenth embodiment of the invention will be described in detail with reference to FIG. 27. FIG. 27 is a block diagram showing the transmitter/receiver apparatus of the seventeenth embodiment of the invention. The transmitter/receiver apparatus of this embodiment complies with IEEE Std. 1394a-2000, and is composed of, as shown in the figure, a status check circuit g500, a reference table g501, a bus arbitration circuit g502, a base register g503, a delay calculation circuit g504, and four ports g505, g506, g507, and g508.

The status check circuit g500 checks whether the individual ports g505 to g508 are active or not on the basis of the status signals obtained by way of signal lines h505, h506, h507, and h508, and outputs the result of the checks (the combination of active ports) to the delay calculation circuit g504 by way of a signal line h500.

The reference table g501 holds, for each of the ports g505 to g508, the transmission delay value through that port and through the signal format converter for that port (what is dealt with here is not the transmission delay values themselves but values calculated from the actual transmission delay values according to a predetermined calculation formula, and larger values represent larger transmission delays; this applies throughout the following descriptions).

The bus arbitration circuit g502 arbitrates conflicts for the access to an IEEE serial bus. Moreover, to the bus arbitration circuit g502 is connected the base register g503, in which are stored the conditions under which the transmitter/receiver apparatus should operate. Thus, the transmitter/receiver apparatus operates under the conditions stored in the base register g503. The ports g505 to g508 each exchange signals with an external node.

According to the output signal (the combination of active ports) of the status check circuit g500, the delay calculation circuit g504 selects, from among the transmission delay values through active ports stored in the reference table g501, the two largest, then adds together the two values and the maximum transmission delay value required for signal processing in the physical layer, and then assigns their sum to the delay region (see FIG. 33) of the base register g503 by way of a signal line h503.

In the transmitter/receiver apparatus configured as described above, consider, for example, a case where the ports g505, g506, and g508 are active and the port g507 is nonactive. In this case, by the conventional method, the transmission delay of the node is set equal to and kept constant at the maximum transmission delay value among all the combinations of the ports including the nonactive port g507. By contrast, in the transmitter/receiver apparatus of this embodiment, from among the transmission delay values through the active ports g505, g506, and g508, the two largest are selected, then the two values and the maximum transmission delay value required for signal processing in the physical layer are added together, and their sum is assigned to the delay region of the base register g503.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Eighteenth Embodiment

Figure 28:
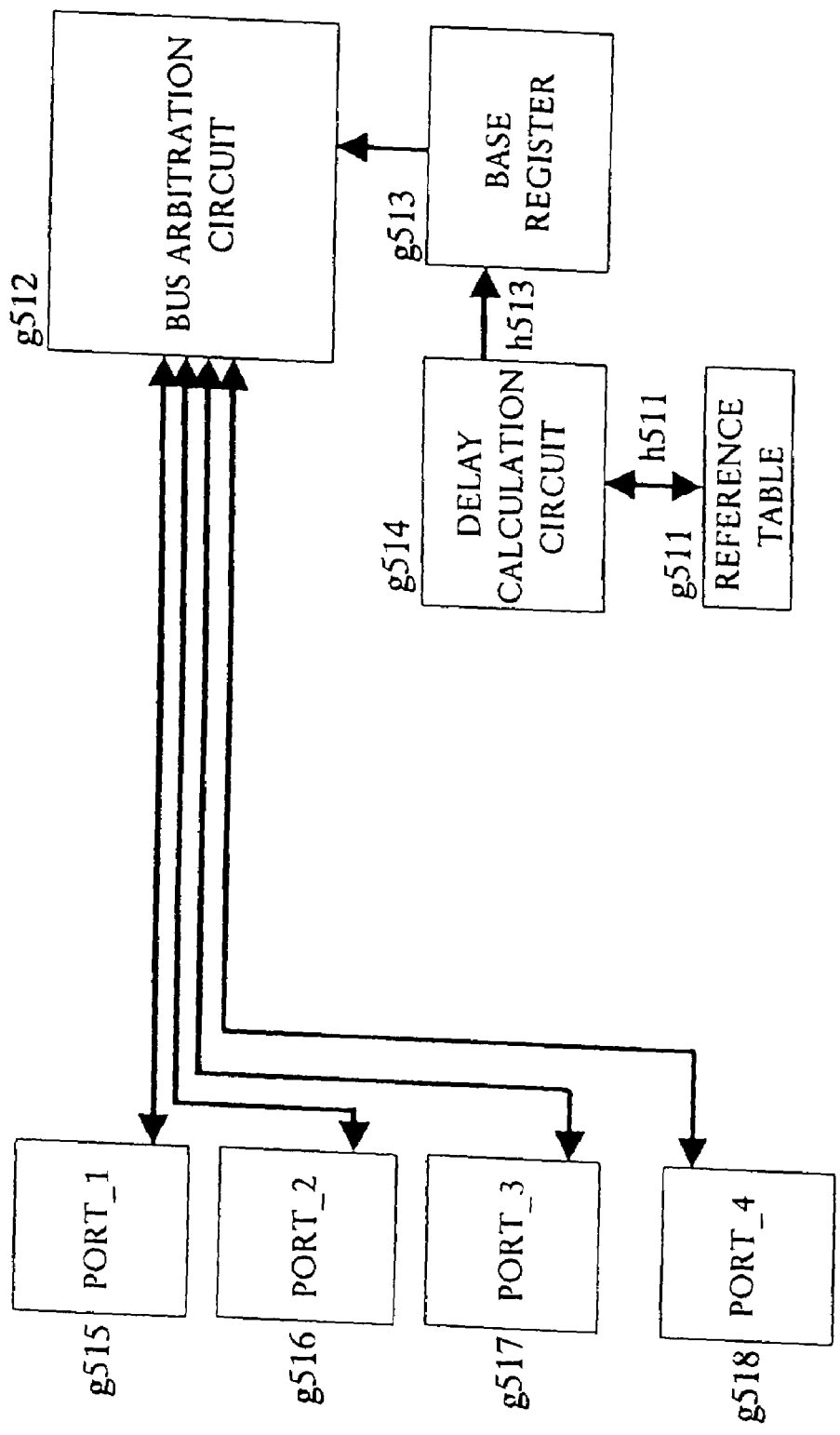
FIG. 28 is a block diagram showing the transmitter/receiver apparatus of a eighteenth embodiment of the invention.

Next, the transmitter/receiver apparatus of an eighteenth embodiment of the invention will be described in detail with reference to FIG. 28. FIG. 28 is a block diagram showing the transmitter/receiver apparatus of the eighteenth embodiment of the invention. The transmitter/receiver apparatus of this embodiment complies with IEEE Std. 1394a-2000, and is composed of, as shown in the figure, a reference table g511, a bus arbitration circuit g512, a base register g513, a delay calculation circuit g514, and four ports g515, g516, g517, and g518.

The reference table g511 holds, for each of the ports g515 to g518, the transmission delay value through that port and through the signal format converter for that port.

The bus arbitration circuit g512 arbitrates conflicts for the access to an IEEE serial bus. Moreover, to the bus arbitration circuit g512 is connected the base register g513, in which are stored the conditions under which the transmitter/receiver apparatus should operate. Thus, the transmitter/receiver apparatus operates under the conditions stored in the base register g513. The ports g515 to g518 each exchange signals with an external node.

The delay calculation circuit g514 compares the transmission delay value obtained by adding together the two largest of the transmission delay values stored in the reference table g511 with the transmission delay value required by a given port to handle signal input and output singly (i.e., the transmission delay value after a control signal is input to a given port until the port returns a control signal in response to the control signal), then adds to the larger of the two values the maximum transmission delay value required for signal processing in the physical layer, and then assigns the result to the delay region (see FIG. 33) of the base register g513 by way of a signal line h513.

With this configuration, even when signal input and output are handled by a single port, it is possible to avoid setting the transmission delay value of the transmitter/receiver apparatus unduly small. This helps secure a sufficient gap count [Gap_count] and hence sufficient gaps and thereby conduct communication surely.

Nineteenth Embodiment

Figure 29:
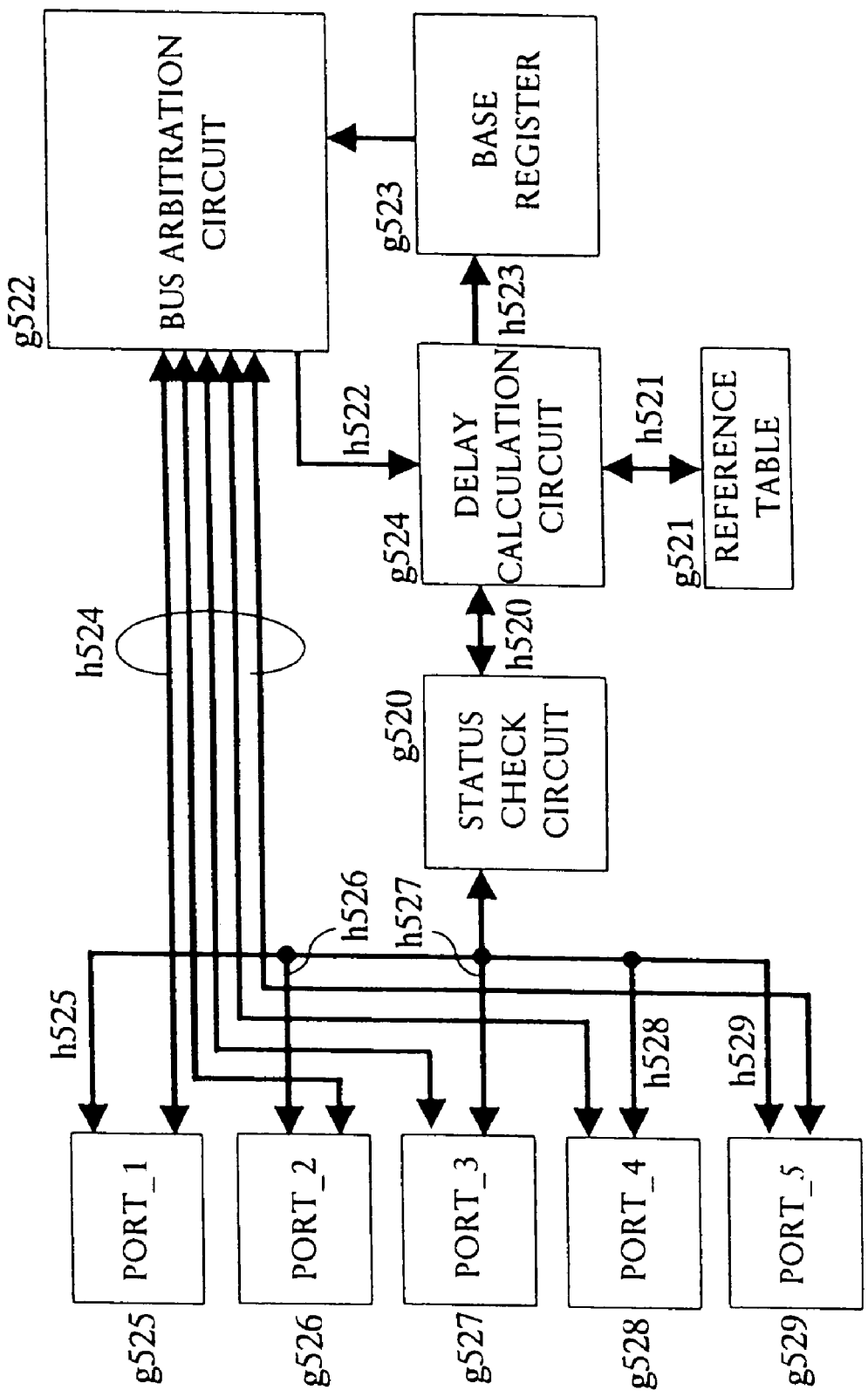
FIG. 29 is a block diagram showing the transmitter/receiver apparatus of a nineteenth embodiment of the invention.

Next, the transmitter/receiver apparatus of a nineteenth embodiment of the invention will be described in detail with reference to FIG. 29. FIG. 29 is a block diagram showing the transmitter/receiver apparatus of the nineteenth embodiment of the invention. The transmitter/receiver apparatus of this embodiment complies with IEEE Std. 1394a-2000, and is composed of, as shown in the figure, a status check circuit g520, a reference table g521, a bus arbitration circuit g522, a base register g523, a delay calculation circuit g524, and five ports g525, g526, g527, g528, and g529.

The status check circuit g520 checks whether the individual ports g525 to g529 are active or not on the basis of the status signals obtained by way of signal lines h525, h526, h527, h528, and h529 and outputs the result of the checks (the combination of active ports) to the delay calculation circuit g524 by way of a signal line h520.

The reference table g521 holds, for each of the ports g525 to g529, the transmission delay value through that port and through the signal format converter for that port.

The bus arbitration circuit g522 arbitrates conflicts for the access to an IEEE serial bus, and exchanges signals with the individual ports g525 to g529 by way of a signal line h524. Here, the bus arbitration circuit g522 checks from which port it has received a signal, and outputs the result of the check (information on the input port) to the delay calculation circuit g524 by way of a signal line h522. Moreover, to the bus arbitration circuit g522 is connected the base register g523, in which are stored the conditions under which the transmitter/receiver apparatus should operate. Thus, the transmitter/receiver apparatus operates under the conditions stored in the base register g523. The ports g525 to g529 each exchange signals with an external node.

According to the output signal (the combination of active ports) of the status check circuit g520 and the information on the input port obtained from the bus arbitration circuit g522, the delay calculation circuit g524 compares the transmission delay value obtained by adding together the two largest of the transmission delay values through the active ports excluding the signal input port stored in the reference table g521 with the transmission delay value required by the signal input port to handle signal input and output singly, then adds to the larger of the two values the maximum transmission delay value required for signal processing in the physical layer, and then assigns the result to the delay region (see FIG. 33) of the base register g523 by way of a signal line h523.

In the transmitter/receiver apparatus configured as described above, consider, for example, a case where the ports other than the port g529 are active, and a signal is input to the port g525. In this case, by the conventional method, the transmission delay of the node is set equal to and kept constant at the maximum transmission delay value among all the combinations of the ports including the nonactive port g529. By contrast, in the transmitter/receiver apparatus of this embodiment, the transmission delay value obtained by adding together the two largest of the transmission delay values through the active ports g526 to g528 excluding the signal input port g525 is compared with the transmission delay value required by the signal input port g525 to handle signal input and output singly, then to the larger of the two values is added the maximum transmission delay value required for signal processing in the physical layer to calculate the transmission delay value of the node, and then the result is assigned to the delay region of the base register g523.

With this configuration, it is possible to avoid setting the transmission delay value of the transmitter/receiver apparatus unnecessarily large. This helps optimize the gap count [Gap_count] and hence the gaps themselves and thereby conduct communication efficiently.

Twentieth Embodiment

Figure 30:
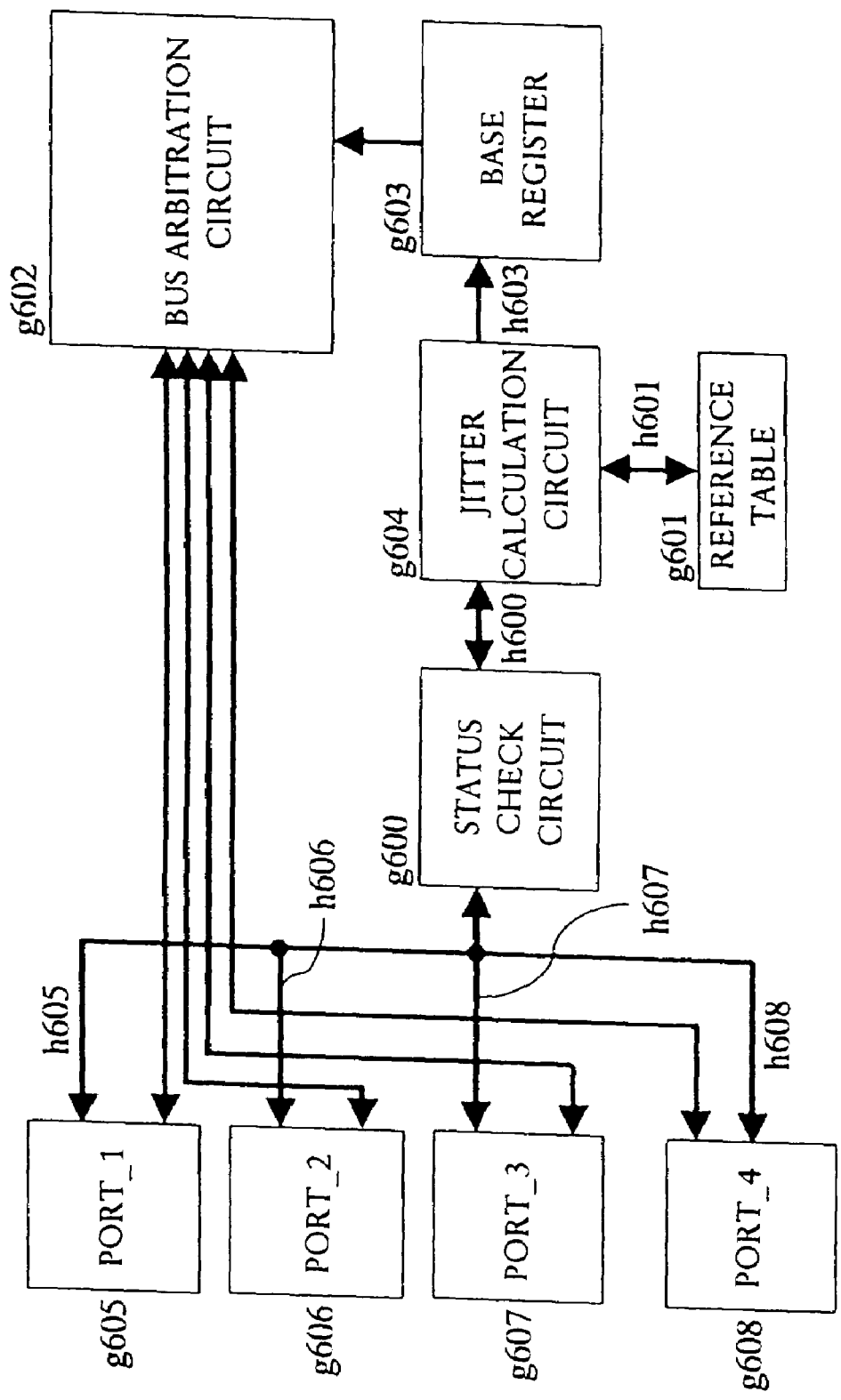
FIG. 30 is a block diagram showing the transmitter/receiver apparatus of a twelfth embodiment of the invention.

Next, the transmitter/receiver apparatus of a twentieth embodiment of the invention will be described in detail with reference to FIG. 30. FIG. 30 is a block diagram showing the transmitter/receiver apparatus of the twentieth embodiment of the invention. The transmitter/receiver apparatus of this embodiment complies with IEEE Std. 1394a-2000, and is composed of, as shown in the figure, a status check circuit g600, a reference table g601, a bus arbitration circuit g602, a base register g603, a jitter calculation circuit g604, and four ports g605, g606, g607, and g608.

The status check circuit g600 checks whether the individual ports g605 to g608 are active or not on the basis of the status signals obtained by way of signal lines h605, h606, h607, and h608, and outputs the result of the checks (the combination of active ports) to the jitter calculation circuit g604 by way of a signal line h600.

The reference table g601 holds, for each of the ports g605 to g608, the jitter value through that port and through the signal format converter for that port (what is dealt with here is not the jitter values themselves but values calculated from the actual jitter values according to a predetermined calculation formula, and larger values represent larger jitters; this applies throughout the following descriptions).

The bus arbitration circuit g602 arbitrates conflicts for the access to an IEEE serial bus. Moreover, to the bus arbitration circuit g602 is connected the base register g603, in which are stored the conditions under which the transmitter/receiver apparatus should operate. Thus, the transmitter/receiver apparatus operates under the conditions stored in the base register g603. The ports g605 to g608 each exchange signals with an external node.

According to the output signal (the combination of active ports) of the status check circuit g600, the jitter calculation circuit g604 selects, from among the jitter values through active ports stored in the reference table g601, the two largest, then adds together the two values and the maximum jitter value required for signal processing in the physical layer, and then assigns their sum to the jitter region (see FIG. 33) of the base register g603 by way of a signal line h603.

In the transmitter/receiver apparatus configured as described above, consider, for example, a case where the ports g605, g606, and g608 are active and the port g607 is nonactive. In this case, by the conventional method, the jitter of the node is set equal to and kept constant at the maximum jitter value among all the combinations of the ports including the nonactive port g607. By contrast, in the transmitter/receiver apparatus of this embodiment, from among the jitter values through the active ports g605, g606, and g608, the two largest are selected, then the two values and the maximum jitter value required for signal processing in the physical layer are added together, and their sum is assigned to the jitter region of the base register g603.

With this configuration, it is possible to avoid setting the jitter value of the transmitter/receiver apparatus unnecessarily large. This helps optimize the gap count [Gap_count] and hence the gaps themselves and thereby conduct communication efficiently.

Twenty-First Embodiment

Figure 31:
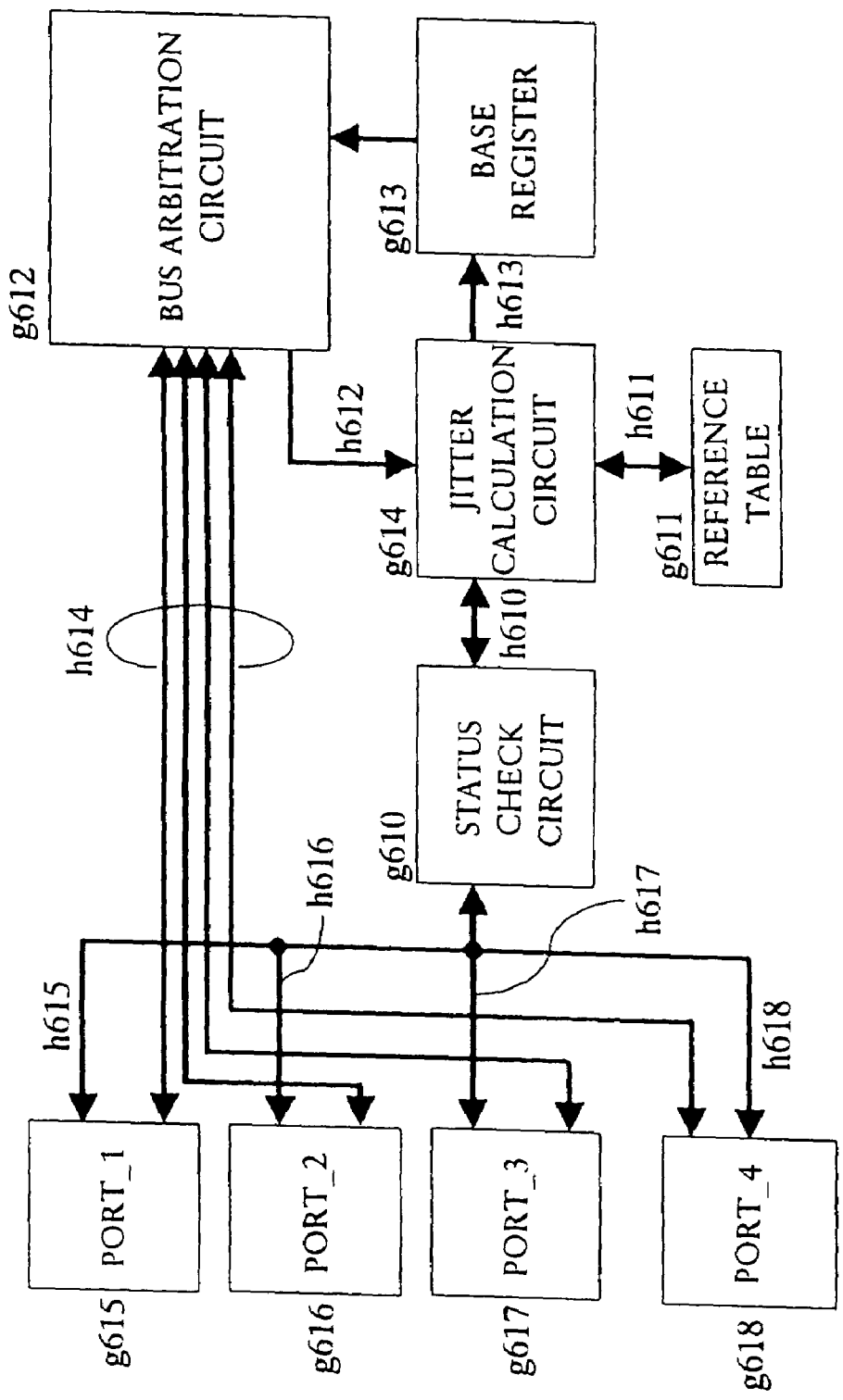
FIG. 31 is a block diagram showing the transmitter/receiver apparatus of a twenty-first embodiment of the invention.
Figure 32:
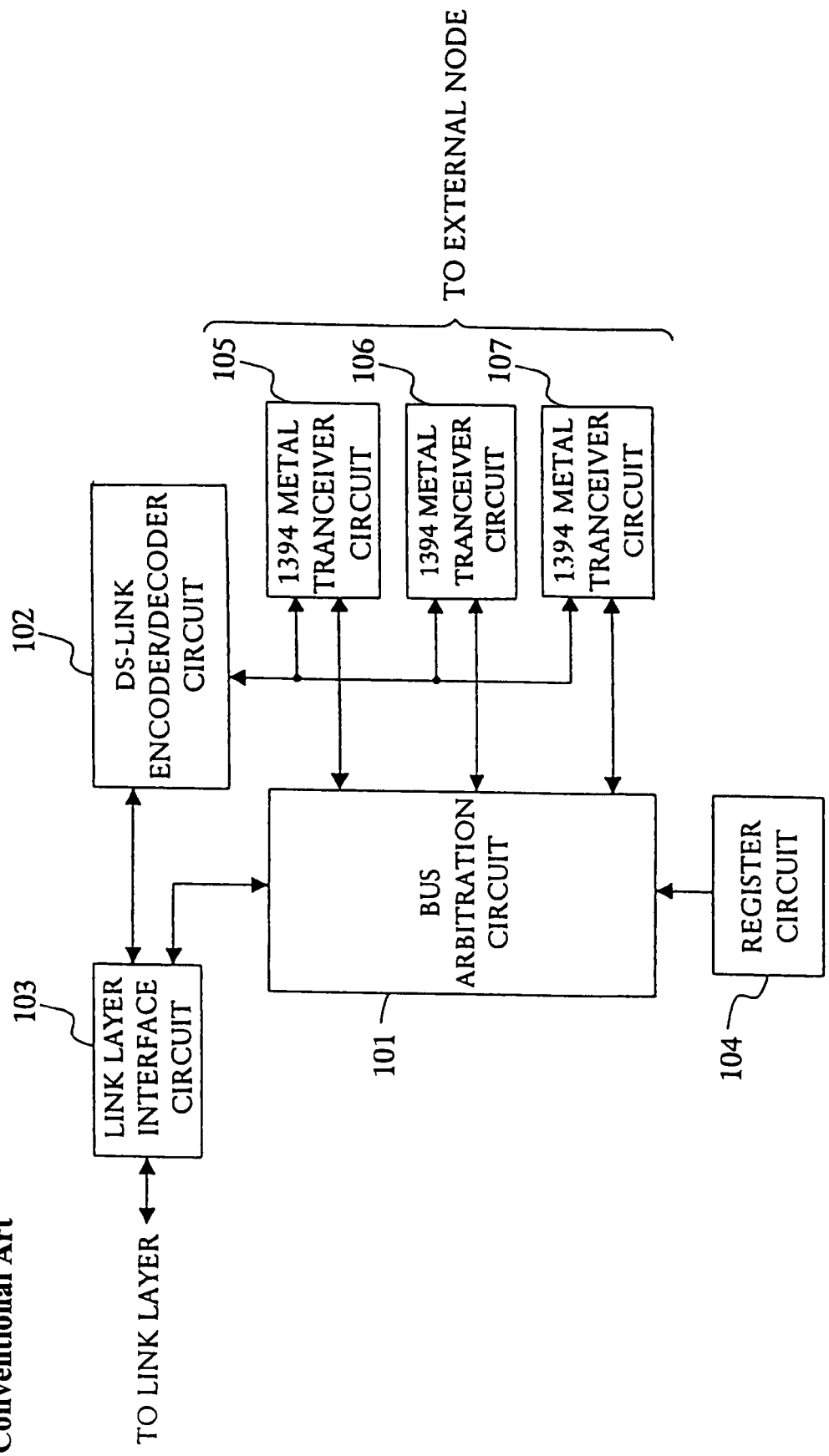
FIG. 32 is a block diagram showing an example of a conventional physical layer circuit complying with IEEE Std. 1394a-2000.
Figure 34:
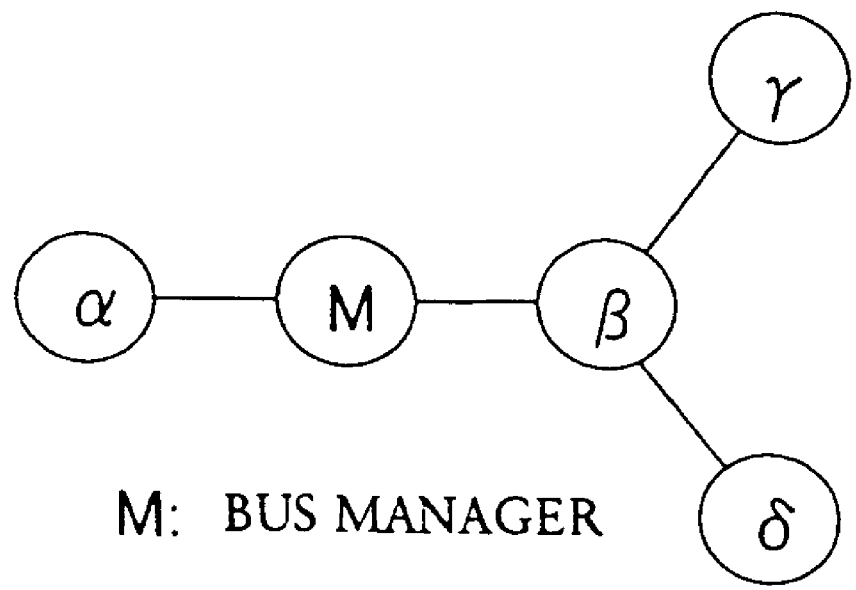
FIG. 34 is a diagram showing an example of the bus topology used to calculate the transition delay time [Round-trip_delay]
Figure 37:
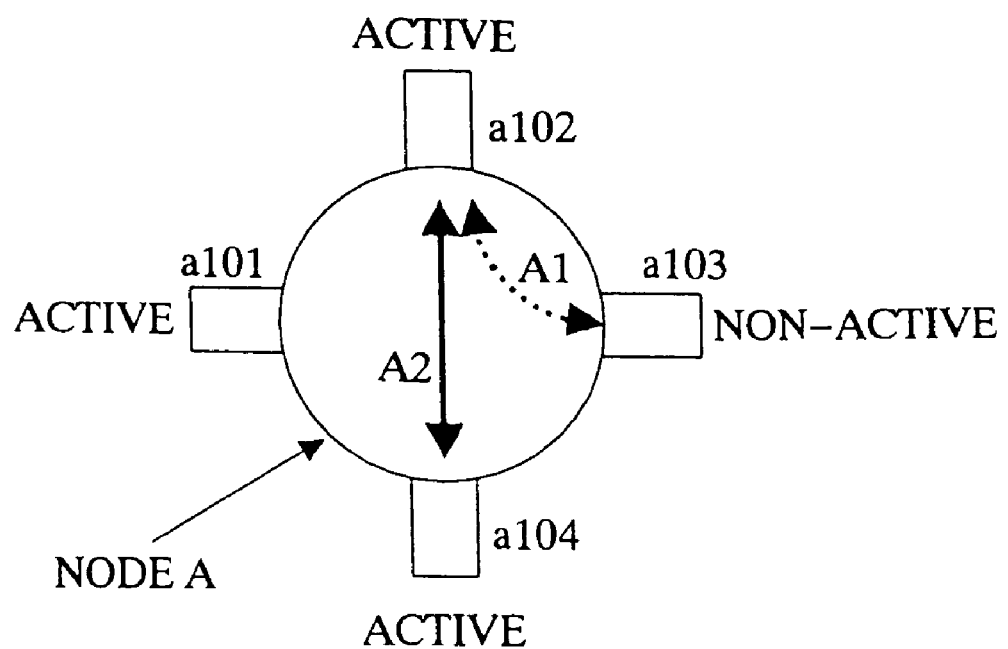
FIG. 37 is a diagram showing an example of a node in which active and nonactive ports mixedly exist.
Figure 38:
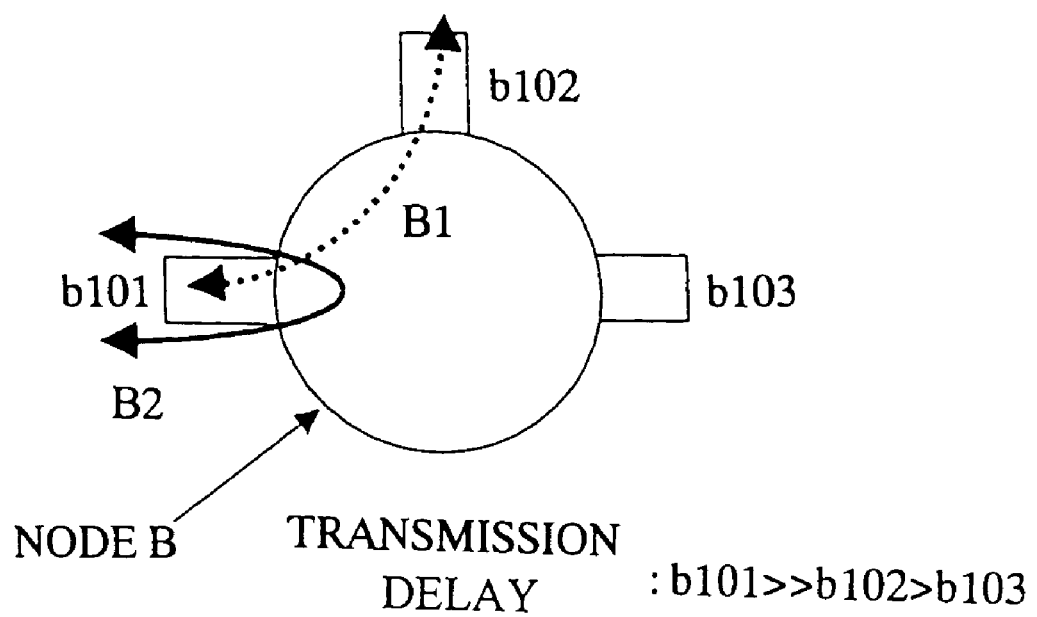
FIG. 38 is a diagram showing an example of a node in which the transmission delay is largest when a signal is transmitted and received via the same port.
Figure 39:
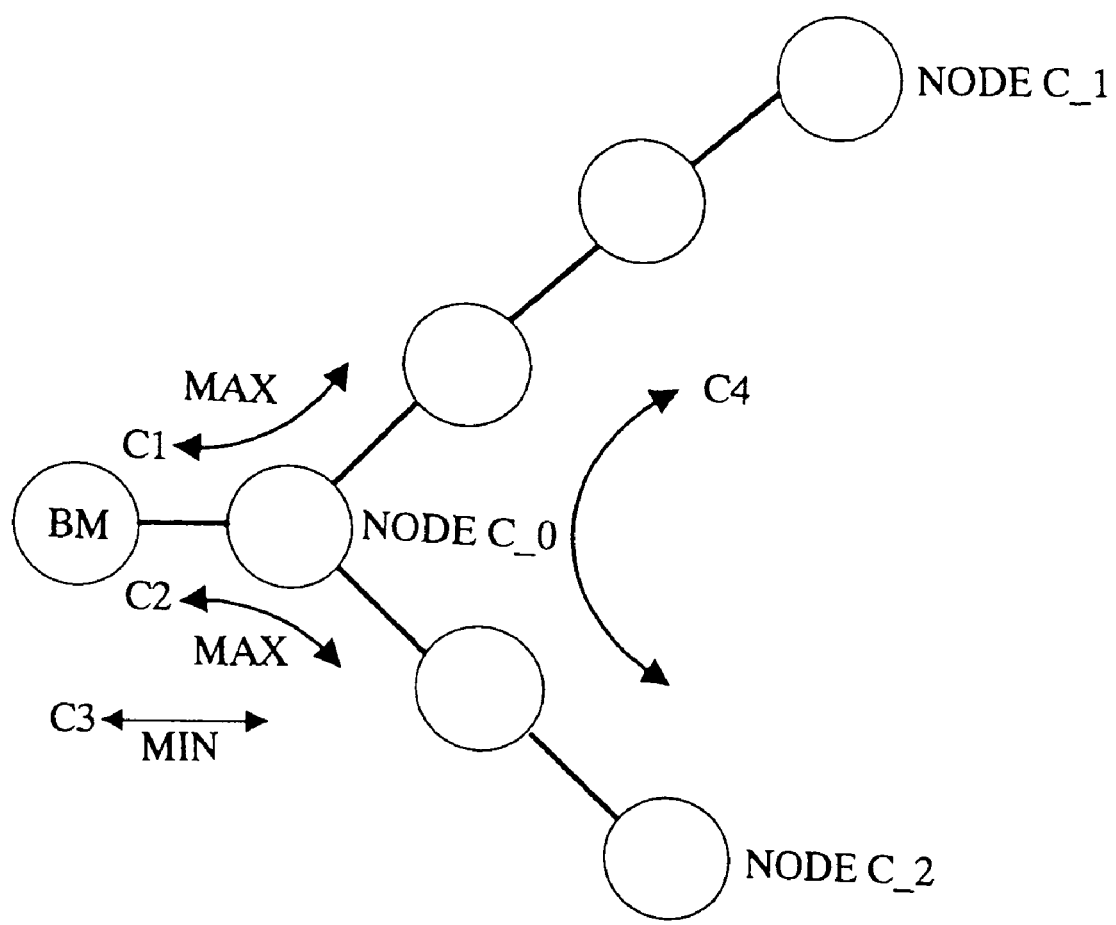
FIG. 39 is a diagram showing an example of the bus topology where the bus manager is not located on the longest path.
Figure 40:
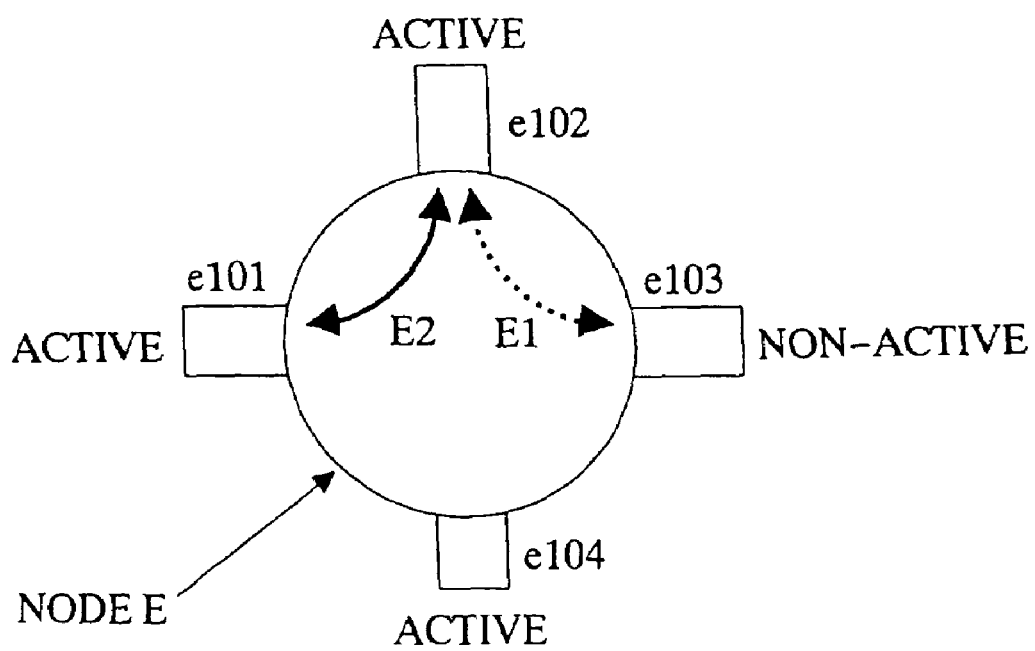
FIG. 40 is a diagram showing an example of a node in which active and nonactive ports mixedly exist.
Figure 41:
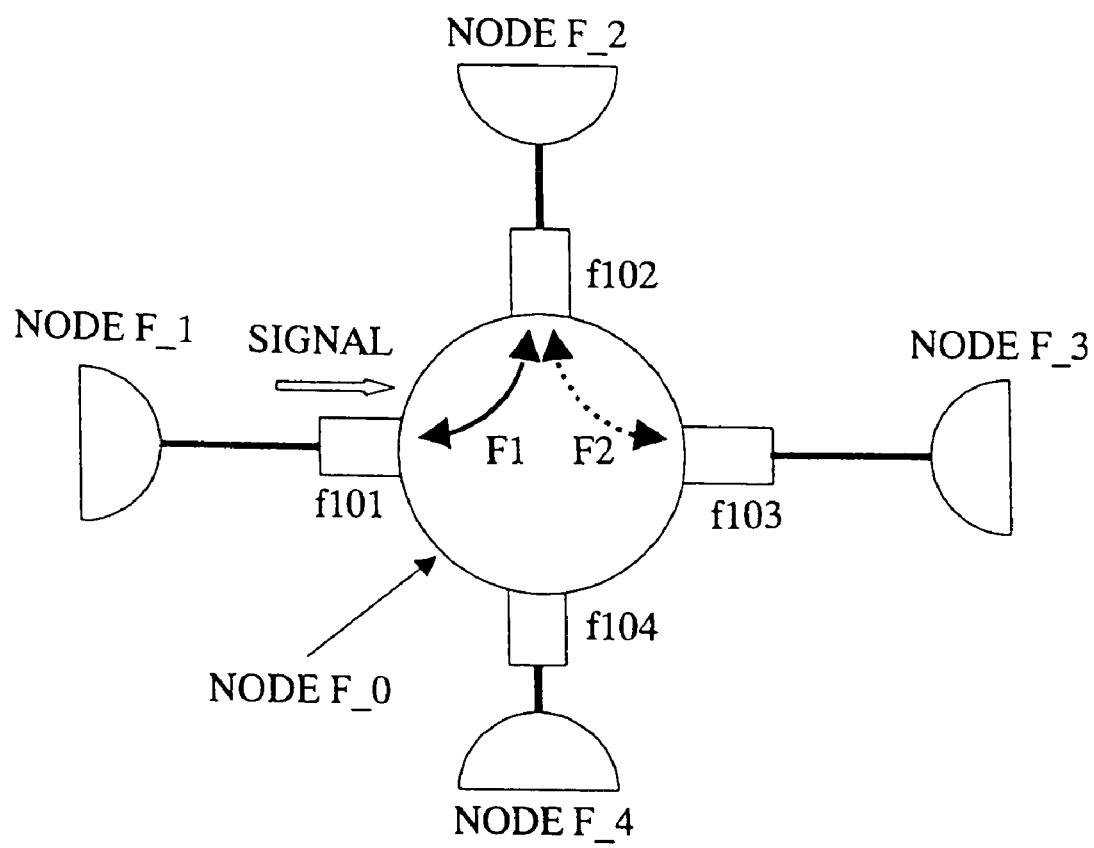
FIG. 41 is a diagram illustrating the problem of the jitter occurring when a control signal is input in via a port.

Next, the transmitter/receiver apparatus of a twenty-first embodiment of the invention will be described in detail with reference to FIG. 31. FIG. 31 is a block diagram showing the transmitter/receiver apparatus of the twenty-first embodiment of the invention. The transmitter/receiver apparatus of this embodiment complies with IEEE Std. 1394a-2000, and is composed of, as shown in the figure, a status check circuit g610, a reference table g611, a bus arbitration circuit g612, a base register g613, a jitter calculation circuit g614, and four ports g615, g616, g617, and g618.

The status check circuit g610 checks whether the individual ports g615 to g618 are active or not on the basis of the status signals obtained by way of signal lines h615, h616, h617, and h618, and outputs the result of the checks (the combination of active ports) to the jitter calculation circuit g614 by way of a signal line h610.

The reference table g611 holds, for each of the ports g615 to g619, the jitter value through that port and through the signal format converter for that port.

The bus arbitration circuit g612 arbitrates conflicts for the access to an IEEE serial bus, and exchanges signals with the individual ports g615 to g618 by way of a signal line h614. Here, the bus arbitration circuit g612 checks from which port it has received a signal, and outputs the result of the check (information on the input port) to the jitter calculation circuit g614 by way of a signal line h612. Moreover, to the bus arbitration circuit g612 is connected the base register g613, in which are stored the conditions under which the transmitter/receiver apparatus should operate. Thus, the transmitter/receiver apparatus operates under the conditions stored in the base register g613. The ports g615 to g615 each exchange signals with an external node.

According to the output signal (the combination of active ports) of the status check circuit g610 and the information on the input port obtained from the bus arbitration circuit g612, the jitter calculation circuit g614 adds together the jitter value required for the signal input port to handle signal input and output singly, the maximum jitter value through the active ports excluding the signal input port stored in the reference table g611, and the maximum jitter value required for signal processing in the physical layer, and then assigns the sum to the jitter region (see FIG. 33) of the base register g613 by way of a signal line h613.

In the transmitter/receiver apparatus configured as described above, consider, for example, a case where the ports other than the port g617 are active, and a signal is input to the port g615. In this case, by the conventional method, the jitter of the node is set equal to and kept constant at the maximum jitter value among all the combinations of the ports including the nonactive port g617. By contrast, in the transmitter/receiver apparatus of this embodiment, the sum of the jitter value required for the signal input port g615 to handle signal input and output singly, the maximum jitter value through the active ports g616 and g618 excluding the signal input port g615, and the maximum jitter value required for signal processing in the physical layer is assigned, as the jitter value of the node, to the jitter region of the base register g613.

With this configuration, it is possible to avoid setting the jitter value of the transmitter/receiver apparatus unnecessarily large. This helps optimize the gap count [Gap_count] and hence the gaps themselves and thereby conduct communication efficiently.

The embodiments described above (except the fourth to sixth and ninth to eleventh embodiments) deal with cases where the present invention is applied to a transmitter/receiver apparatus complying with IEEE Std. 1394a-2000. It is to be understood, however, that the present invention is applicable also to transmitter/receiver apparatuses of any other type, for example those complying with IEEE Std. 1394b, the OP i.LINK standard, or the like.

The embodiments described above deal with cases where the operations for checking whether the ports are active or not and for setting the delay and jitter values are realized on a hardware basis. It is to be understood, however, that these operations may be realized on a software basis.

As described above, with a transmitter/receiver apparatus embodying the present invention, it is possible to set the transmission delay and jitter of a node appropriately according to the operation status of individual ports, and thereby avoid setting the transmission delay or jitter unnecessarily large. This makes efficient communication possible. Moreover, with a transmitter/receiver apparatus embodying the present invention, it is possible to set the transmission delay and jitter of a node that replies to the bus manager managing the bus appropriately according to the type of active ports. This makes efficient communication possible irrespective of the standard with which the bus manager compiles.

What is claimed is:

1. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a delay value optimizing processor that monitors the individual ports and optimizes a transmission delay value of the transmitter/receiver apparatus according to operation status of the individual ports,
wherein the delay value optimizing processor includes:
a status checker that checks for active individual ports; and
a reference table that holds, among transmission delay values between the individual ports, maximum values corresponding to different combinations of active ports,
wherein a value read out from the reference table according to an output signal of the status checker is assigned, as the transmission delay value of the transmitter/receiver apparatus, to the register.

2. The transmitter/receiver apparatus according to claim 1, wherein a communication line by way of which communication is conducted with an external node complies with one of IEEE Std. 1394a-2000 or IEEE Std. 1394b.

3. A transmitter/receiver apparatus comprising:
a plurality of ports of different types;
a bus arbitration circuit that controls timing with which signals are output from the individual ports to a serial bust;
a register in which are stored conditions under which the bus arbitration circuit should operate; and
a delay value optimizing processor that monitors the individual ports and optimizes a transmission delay value of the transmitter/receiver apparatus according to operation status of the individual ports,
wherein the delay value optimizing processor includes:
a status checker that checks for active individual ports; and
a reference table that holds whichever are larger between, among transmission delay values between the individual ports, maximum values corresponding to different combinations of active ports and, among transmission delay values required for the individual ports to handle signal input and output singly, maximum values corresponding to different combinations of active ports,
wherein a value read out from the reference table according to an output signal of the status checker is assigned, as the transmission delay value of the transmitter/receiver apparatus, to the register.

4. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a delay value optimizing processor that monitors the individual ports and optimizes a transmission delay value of the transmitter/receiver apparatus according to operation status of the individual ports,
wherein the delay value optimizing processor includes:
a status checker that checks for active individual ports; and
a reference table that holds, for each of the ports, whichever are larger between, among transmission delay values between the ports excluding that port, maximum values corresponding to different combinations of active ports and a transmission delay value required for that port to handle signal input and output singly,
wherein a value read out from the reference table according to an output signal of the status checker and input port mfoimation obtained from the bus arbitration circuit is assigned, as the transmission delay value of the transmitter/receiver apparatus, to the register.

5. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a reference table that holds whichever are larger between maximum transmission delay values between the individual ports and maximum transmission delay values required for the individual ports to handle signal input and output singly, wherein a value read out from the reference table is assigned, as the transmission delay value of the transmitter/receiver apparatus, to the register.

6. The transmitter/receiver apparatus according to claim 5, wherein a communication line by way of which communication is conducted with an external node complies with one of IEEE Std. 1394a-2000 or IEEE Std. 1394b.

7. A transmitter/receiver apparatus comprising:
a plurality of ports of different types;
a bus arbitration circuit that controls timing with which signals are output from the individual ports to a serial bus;
a first register in which a first operation condition of the bus arbitration circuit is stored;
a second register in which a second operation condition of the bus arbitration circuit is stored;
a delay value optimizing processor that monitors the individual ports and optimizes a transmission delay value of the transmitter/receiver apparatus according to operation status and type of the individual ports,
wherein the delay value optimizing processor includes:
a status checker that checks for active individual ports; and
a delay setter that checks for a type of active ports by referring to an output signal of the status checker and to the second register and that, according to a result of the checking, assigns a transmission delay value stored in the second register to the first register.

8. A transmitter/receiver apparatus comprising:
a plurality of ports of different types;
a bus arbitration circuit that controls timing with which signals are output from the individual ports to a serial bus;
a first register in which a first operation condition of the bus arbitration circuit is stored;
a second register in which a second operation condition of the bus arbitration circuit is stored;
a delay value optimizing processor that monitors the individual ports and optimizes a transmission delay value of the transmitter/receiver apparatus according to operation status and type of the individual ports.
wherein the delay value optimizing processor includes:
a status checker that checks for active individual ports; and
a delay setter that checks for a type of active ports by referring to an output signal of the status checker and to the second register, that monitors signal lines by way of which the bus arbitration circuit is connected to the first and second registers respectively to check access to the first and second registers from an external node, and that, according to a result of the checking, assigns a transmission delay value stored in the second register to the first register.

9. A transmitter/receiver apparatus comprising:
a plurality of ports of different types;
a bus arbitration circuit that controls timing with which signals are output from the individual ports to a serial bus;
a first register in which a first operation condition of the bus arbitration circuit is stored;
a second register in which a second operation condition of the bus arbitration circuit is stored;
a delay value optimizing processor that monitors the individual ports and optimizes a transmission delay value of the transmitter/receiver apparatus according to operation status and type of the individual ports,
wherein the delay value optimizing processor includes:
a status checker that checks for active individual ports; and
a delay setter that checks for a type of active ports by referring to an output signal of the status checker and to the second register, that monitors signal lines by way of which the bus arbitration circuit is connected to the first and second registers respectively to check access to the first and second registers from an external node, and that, according to a result of the checking, assigns a transmission delay value stored in the second register to a reply packet returned to the external node.

10. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a jitter value optimizing processor that monitors the individual ports and optimizes a jitter value of the transmitter/receiver apparatus according to operation status of the individual ports,
wherein the jitter value optimizing processor includes:
a status checker that checks for active individual ports; and
a reference table that holds, among jitter values between the individual ports, maximum values corresponding to different combinations of active ports,
wherein a value read out from the reference table according to an output signal of the status checker is assigned, as the jitter value of the transmitter/receiver apparatus, to the register.

11. The transmitter/receiver apparatus according to claim 10, wherein a communication line by way of which communication is conducted with an external node complies with one of IEEE Std. 1394a-2000 or IEEE Std. 1394b.

12. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a jitter value optimizing processor that monitors the individual ports and optimizes a jitter value of the transmitter/receiver apparatus according to operation status of the individual ports,
wherein the jitter value optimizing processor includes:
a status checker that checks for active individual ports; and
a reference table that holds, for each of the ports, among jitter values between that port and the other ports, maximum values corresponding to different combinations of active ports,
wherein a value read out from the reference table according to an output signal of the status checker and input port information obtained from the bus arbitration circuit is assigned, as the jitter value of the transmitter/ receiver apparatus, to the register.

13. A transmitter/receiver apparatus comprising:
a plurality of ports of different types;
a bus arbitration circuit that controls timing with which signals are output from the individual ports to a serial bus;
a first register in which a first operation condition of the bus arbitration circuit is stored;

a second register in which a second operation condition of the bus arbitration circuit is stored;

a jitter value optimizing processor that monitors the individual ports and optimizes a jitter value of the transmitter/receiver apparatus according to operation status and type of the individual ports, wherein the jitter value optimizing processor includes:

a status checker that checks for active individual ports; and a jitter setter that checks for a type of active ports by referring to an output signal of the status checker and to the second register and that, according to a result of the checking, assigns a jitter value stored in the second register to the first register.

14. A transmitter/receiver apparatus comprising:

a plurality of ports of different types;

a bus arbitration circuit that controls timing with which signals are output from the individual ports to a serial bus;

a first register in which a first operation condition of the bus arbitration circuit is stored;

a second register in which a second operation condition of the bus arbitration circuit is stored;

a jitter value optimizing processor that monitors the individual ports and optimizes a jitter value of the transmitter/receiver apparatus according to operation status and type of the individual ports, wherein the jitter value optimizing processor includes:

a status checker that checks for active individual ports; and a jitter setter that checks for a type of active ports by referring to an output signal of the status checker and to the second register, that monitors signal lines by way of which the bus arbitration circuit is connected to the first and second registers respectively to check access to the first and second registers from an external node, and that, according to a result of the checking, assigns a jitter value stored in the second register to the first register.

15. A transmitter/receiver apparatus comprising:

a plurality of ports of different types;

a bus arbitration circuit that controls timing with which signals are output from the individual ports to a serial bus;

a first register in which a first operation condition of the bus arbitration circuit is stored;

a second register in which a second operation condition of the bus arbitration circuit is stored;

a jitter value optimizing processor that monitors the individual ports and optimizes a jitter value of the transmitter/receiver apparatus according to operation status and type of the individual ports, wherein the jitter value optimizing processor includes:

a status checker that checks whether the individual ports are active or not; and a jitter setter that checks type of active ports by referring to an output signal of the status checker and to the second register, that monitors signal lines by way of which the bus arbitration circuit is connected to the first and second registers respectively to check access to the first and second registers from an external node, and that, according to a result of the checking, assigns a jitter value stored in the second register to a reply packet returned to the external node.

16. A transmitter/receiver apparatus comprising:

a plurality of ports of different types;

a bus arbitration circuit that controls timing with which signals are output from the individual ports to a serial bus;

a register in which are stored conditions under which the bus arbitration circuit should operate; and a delay value optimizing processor that monitors the individual ports and optimizes a transmission delay value of the transmitter/receiver apparatus according to operation status of the individual ports, wherein the delay value optimizing processor includes:

a status checker that checks for active individual ports;

a reference table that holds transmission delay values between the individual ports; and a delay selector that selects, according to an output signal of the status checker, a maximum transmission delay value between active ports from among all the transmission delay values stored in the reference table, and that then assigns the selected value to the register.

17. A transmitter/receiver apparatus comprising:

a plurality of ports of different types;

a bus arbitration circuit that controls timing with which signals are output from the individual ports to a serial bus;

a register in which are stored conditions under which the bus arbitration circuit should operate; and a delay value optimizing processor that monitors the individual ports and optimizes a transmission delay value of the transmitter/receiver apparatus according to operation status of the individual ports, wherein the delay value optimizing processor includes:

a status checker that checks for active individual ports;

a reference table that holds transmission delay values between the individual ports and transmission delay values required for the individual ports to handle signal input and output singly; and a delay selector that selects, according to an output signal of the status checker, a maximum transmission delay value involving an active port from among all the transmission delay values stored in the reference table, and that then assigns the selected value to the register.

18. A transmitter/receiver apparatus comprising:

a plurality of ports of different types;

a bus arbitration circuit that controls timing with which signals are output from the individual ports to a serial bus;

a register in which are stored conditions under which the bus arbitration circuit should operate; and a delay value optimizing processor that monitors the individual ports and optimizes a transmission delay value of the transmitter/receiver apparatus according to operation status of the individual ports, wherein the delay value optimizing processor includes:

a status checker that checks for active individual ports;

a reference table that holds transmission delay values between the individual ports and transmission delay values required for the individual ports to handle signal input and output singly; and a delay selector that selects, according to an output signal of the status checker and input port information obtained from the bus arbitration circuit, a largest of transmission delay values between active ports other than a signal input port and a transmission delay value required for the signal input port to handle signal input and output singly from among all the transmission delay values stored in the reference table, and that then assigns the selected value to the register.

19. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a jitter value optimizing processor that monitors the individual ports and optimizes a jitter value of the transmitter/receiver apparatus according to operation status of the individual ports,
wherein the jitter value optimizing processor includes:
a status checker that checks for active individual ports;
a reference table that holds jitter values between the individual ports; and
a jitter selector that selects, according to an output signal of the status checker, a maximum jitter value between active ports from among all the jitter values stored in the reference table, and that then assigns the selected value to the register.

20. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a jitter value optimizing processor that monitors the individual ports and optimizes a utter value of the transmitter/receiver apparatus according to operation status of the individual ports,
wherein the jitter value optimizing processor includes:
a status checker that checks for active individual ports;
a reference table that holds jitter values between the individual ports; and
a jitter selector that selects, according to an output signal of the status checker and input port information obtained from the bus arbitration circuit, a maximum jitter value between a signal input port and other active ports from among all the jitter values stored in the reference table, and that then assigns the selected value to the register.

21. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a delay value optimizing processor that monitors the individual ports and optimizes a transmission delay value of the transmitter/receiver apparatus according to operation status of the individual ports,
wherein the delay value optimizing processor includes:
a status checker that checks for active individual ports;
a reference table that holds, for each of the ports, a transmission delay value through that port and through a signal format converter for that port; and
a delay calculator that selects, according to an output signal of the status checker, two largest from among transmission delay values through active ports stored in the reference table, that then adds together the two values and a maximum transmission delay value required for signal processing in a physical layer, and that then assigns a sum thereof to the register.

22. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate;
a reference table that holds, for each of the ports, a transmission delay value through that port and through a signal format converter for that port; and
a delay calculator that compares a transmission delay value obtained by adding together two largest of the transmission delay values stored in the reference table with a transmission delay value required for a given port to handle signal input and output singly, that then adds to whichever of the two values is larger a maximum transmission delay value required for signal processing in a physical layer, and that then assigns a sum thereof to the register.

23. The transmitter/receiver apparatus according to claim 22, wherein a communication line by way of which communication is conducted with an external node complies with one of IEEE Std. 1394a-2000 or IEEE Std. 1394b.

24. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a delay value optimizing processor that monitors the individual ports and optimizes a transmission delay value of the transmitter/receiver apparatus according to operation status of the individual ports,
wherein the delay value optimizing processor includes:
a status checker that checks for active individual ports;
a reference table that holds, for each of the ports, a transmission delay value through that port and through a signal format converter for that port; and
a delay calculator that compares, according to an output signal of the status checker and input port information obtained from the bus arbitration circuit, a transmission delay value obtained by adding together two largest of transmission delay values through active ports excluding a signal input port stored in the reference table with a transmission delay value required for the signal input port to handle signal input and output singly, that then adds to whichever of the two values is larger a maximum transmission delay value required for signal processing in a physical layer, and that then assigns a sum thereof to the register.

25. A transmitter/receiver apparatus comprising:
a plurality of ports of different types;
a bus arbitration circuit that controls timing with which signals are output from the individual ports to a serial bus;
a register in which are stored conditions under which the bus arbitration circuit should operate; and
a jitter value optimizing processor that monitors the individual ports and optimizes a jitter value of the transmitter/receiver apparatus according to operation status of the individual ports,
wherein the jitter value optimizing processor includes:
a status checker that checks for active individual ports;
a reference table that holds, for each of the ports, a jitter value through that port and through a signal format converter for that port; and a jitter calculator that selects, according to an output signal of the status checker, two largest from among jitter values through active ports stored in the reference table, that then adds together the two values and a maximum jitter value required for signal processing in a physical layer, and that then assigns a sum thereof to the register.

26. A transmitter/receiver apparatus comprising:

a plurality of ports of different types;

a bus arbitration circuit that controls timing with which signals are output from the individual ports to a serial bus;

a register in which are stored conditions under which the bus arbitration circuit should operate; and a jitter value optimizing processor that monitors the individual ports and optimizes a jitter value of the transmitter/receiver apparatus according to operation status of the individual ports, wherein the jitter value optimizing processor includes:

a status checker that checks for active individual ports;

a reference table that holds, for each of the ports, a jitter value through that port and through a signal format converter for that port; and a jitter calculator that adds together, according to an output signal of the status checker and input port information obtained from the bus arbitration circuit, a jitter value required for a signal input port to handle signal input and output singly, a maximum jitter value through active ports excluding the signal input port stored in the reference table, and a maximum jitter value required for signal processing in a physical layer, and that then assigns a sum thereof to the register.

* * * * *